United States Patent
Keipert et al.

(10) Patent No.: US 9,632,746 B2
(45) Date of Patent: Apr. 25, 2017

(54) AUTOMATIC MUTING

(71) Applicant: EchoStar Technologies L.L.C., Englewood, CO (US)

(72) Inventors: Kurt Keipert, Littleton, CO (US); Adam Schafer, Aurora, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/715,248

(22) Filed: May 18, 2015

(65) Prior Publication Data
US 2016/0342379 A1    Nov. 24, 2016

(51) Int. Cl.
| | |
|---|---|
| *G06F 3/16* | (2006.01) |
| *G05B 15/02* | (2006.01) |
| *H04N 5/60* | (2006.01) |
| *H04N 5/44* | (2011.01) |

(52) U.S. Cl.
CPC ............ *G06F 3/165* (2013.01); *G05B 15/02* (2013.01); *H04N 5/4403* (2013.01); *H04N 5/60* (2013.01); *H04N 2005/4428* (2013.01)

(58) Field of Classification Search
CPC ...... G06F 3/165; G05B 15/02; H04N 5/4403; H04N 5/60; H04N 2005/4428
USPC .......................................................... 700/94
See application file for complete search history.

(56) References Cited

U.S. PATENT DOCUMENTS

| | | | |
|---|---|---|---|
| 4,386,436 A | 5/1983 | Kocher et al. | |
| 4,581,606 A | 4/1986 | Mallory | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,894,331 A | 4/1999 | Yang | |
| 5,926,090 A * | 7/1999 | Taylor ................. | G08B 21/023 340/539.32 |

(Continued)

FOREIGN PATENT DOCUMENTS

| | | |
|---|---|---|
| CA | 2 267 988 A1 | 4/1998 |
| CN | 105814555 A | 7/2016 |

(Continued)

OTHER PUBLICATIONS

U.S. Appl. No. 14/470,352, filed Aug. 27, 2014 Non Final Office Action mailed Nov. 20, 2015, 28 pages.

(Continued)

*Primary Examiner* — Paul McCord
(74) *Attorney, Agent, or Firm* — Kilpatrick Townsend & Stockton LLP

(57) ABSTRACT

Systems and methods for altering a volume level of an electronic device may include receiving a user input indicative of triggering a remote find operation to locate a remote control, and in response to the user input, sending a remote find instruction to the remote control. The remote find instruction may trigger the remote control to emit a sound. Systems and methods may include, in response to the user input, sending a temporary quiet instruction to the home automation device. The quiet instruction may initiate a lowering of the volume level of the home automation device while the remote control is emitting the sound as a part of the remote find operation.

20 Claims, 7 Drawing Sheets

(56) References Cited

U.S. PATENT DOCUMENTS

| | | | |
|---|---|---|---|
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,182,094 B1 | 1/2001 | Humpleman et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Jungua et al. | |
| 6,502,166 B1 | 12/2002 | Cassidy | |
| 6,529,230 B1 | 3/2003 | Chong | |
| 6,553,375 B1 | 4/2003 | Huang et al. | |
| 6,662,282 B2 | 12/2003 | Cochran | |
| 6,756,998 B1 | 6/2004 | Bilger | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 * | 3/2006 | Griep | G08C 19/28 340/12.54 |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,590,703 B2 | 9/2009 | Cashman et al. | |
| 7,640,351 B2 | 12/2009 | Reckamp et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 5/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,413,204 B2 | 4/2013 | White et al. | |
| 8,498,572 B1 | 7/2013 | Schooley et al. | |
| 8,516,087 B2 | 8/2013 | Wilson et al. | |
| 8,550,368 B2 | 10/2013 | Butler et al. | |
| 8,619,136 B2 | 12/2013 | Howarter et al. | |
| 8,644,525 B2 * | 2/2014 | Bathurst | H04M 3/56 379/202.01 |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,786,698 B2 | 7/2014 | Chen et al. | |
| 8,799,413 B2 | 8/2014 | Taylor et al. | |
| 8,898,709 B2 | 11/2014 | Crabtree | |
| 8,930,700 B2 | 1/2015 | Wielopolski | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,246,921 B1 | 1/2016 | Vlaminck et al. | |
| 9,462,041 B1 | 10/2016 | Hagins et al. | |
| 9,495,860 B2 | 11/2016 | Lett | |
| 9,511,259 B2 | 12/2016 | Mountain | |
| 2001/0012998 A1 | 8/2001 | Jouet et al. | |
| 2002/0019725 A1 | 2/2002 | Petite | |
| 2002/0063633 A1 | 5/2002 | Park | |
| 2002/0080238 A1 | 6/2002 | Ohmura | |
| 2002/0193989 A1 | 12/2002 | Geilhufe et al. | |
| 2003/0005431 A1 | 1/2003 | Shinohara | |
| 2003/0052789 A1 | 3/2003 | Colmenarez et al. | |
| 2003/0097452 A1 | 5/2003 | Kim et al. | |
| 2003/0126593 A1 | 7/2003 | Mault | |
| 2003/0133551 A1 | 7/2003 | Kahn | |
| 2003/0140352 A1 | 7/2003 | Kim | |
| 2003/0201900 A1 | 10/2003 | Bachinski et al. | |
| 2004/0019489 A1 | 1/2004 | Funk et al. | |
| 2004/0117038 A1 | 6/2004 | Karaoguz et al. | |
| 2004/0117843 A1 | 6/2004 | Karaoguz et al. | |
| 2004/0121725 A1 | 6/2004 | Matsui | |
| 2004/0128034 A1 | 7/2004 | Lenker et al. | |
| 2004/0143838 A1 | 7/2004 | Rose | |
| 2004/0148419 A1 | 7/2004 | Chen et al. | |
| 2004/0148632 A1 | 7/2004 | Park et al. | |
| 2004/0260407 A1 | 12/2004 | Wimsatt | |
| 2004/0266419 A1 | 12/2004 | Arling et al. | |
| 2005/0038875 A1 | 2/2005 | Park | |
| 2005/0049862 A1 | 3/2005 | Choi et al. | |
| 2005/0188315 A1 | 8/2005 | Campbell et al. | |
| 2005/0200478 A1 * | 9/2005 | Koch | G06Q 10/08 340/539.13 |
| 2005/0245292 A1 | 11/2005 | Bennett et al. | |
| 2005/0264698 A1 | 12/2005 | Eshleman | |
| 2005/0289614 A1 | 12/2005 | Baek et al. | |
| 2006/0011145 A1 | 1/2006 | Kates | |
| 2006/0087428 A1 | 4/2006 | Wolfe et al. | |
| 2006/0136968 A1 | 6/2006 | Han et al. | |
| 2006/0143679 A1 | 6/2006 | Yamada et al. | |
| 2006/0155389 A1 | 7/2006 | Pessolano et al. | |
| 2007/0044119 A1 | 2/2007 | Sullivan et al. | |
| 2007/0078910 A1 | 4/2007 | Bopardikar | |
| 2007/0129220 A1 | 6/2007 | Bardha | |
| 2007/0135225 A1 | 6/2007 | Nieminen et al. | |
| 2007/0142022 A1 | 6/2007 | Madonna et al. | |
| 2007/0146545 A1 | 6/2007 | Iwahashi | |
| 2007/0157258 A1 | 7/2007 | Jung et al. | |
| 2007/0192486 A1 | 8/2007 | Wilson et al. | |
| 2007/0256085 A1 | 11/2007 | Reckamp et al. | |
| 2007/0271518 A1 | 11/2007 | Tischer et al. | |
| 2007/0275670 A1 | 11/2007 | Chen et al. | |
| 2008/0021971 A1 | 1/2008 | Halgas | |
| 2008/0022322 A1 | 1/2008 | Grannan et al. | |
| 2008/0062258 A1 | 3/2008 | Bentkovski et al. | |
| 2008/0062965 A1 * | 3/2008 | Silva | H04M 1/247 370/352 |
| 2008/0109095 A1 * | 5/2008 | Braithwaite | H04L 12/2823 700/94 |
| 2008/0114963 A1 | 5/2008 | Cannon et al. | |
| 2008/0123825 A1 | 5/2008 | Abramson et al. | |
| 2008/0140736 A1 | 6/2008 | Jarno | |
| 2008/0163330 A1 | 7/2008 | Sparrell | |
| 2008/0278635 A1 * | 11/2008 | Hardacker | H04N 5/44582 348/734 |
| 2008/0284905 A1 | 11/2008 | Chuang | |
| 2008/0288876 A1 | 11/2008 | Fleming | |
| 2008/0297660 A1 | 12/2008 | Shioya | |
| 2009/0023554 A1 | 1/2009 | Shim | |
| 2009/0069038 A1 | 3/2009 | Olague et al. | |
| 2009/0112541 A1 | 4/2009 | Anderson et al. | |
| 2009/0138507 A1 * | 5/2009 | Burckart | G11B 27/105 |
| 2009/0146834 A1 | 6/2009 | Huang | |
| 2009/0165069 A1 | 6/2009 | Kirchner | |
| 2009/0167555 A1 | 7/2009 | Kohanek | |
| 2009/0190040 A1 | 7/2009 | Watanabe et al. | |
| 2009/0249428 A1 | 10/2009 | White et al. | |
| 2009/0271203 A1 | 10/2009 | Resch et al. | |
| 2010/0031286 A1 | 2/2010 | Gupta et al. | |
| 2010/0046918 A1 | 2/2010 | Takao et al. | |

(56) References Cited

U.S. PATENT DOCUMENTS

| | | |
|---|---|---|
| 2010/0083371 A1 | 4/2010 | Bennetts et al. |
| 2010/0097225 A1 | 4/2010 | Petricoin, Jr. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1* | 6/2010 | Kraut ............... H04N 5/60 715/821 |
| 2010/0211546 A1 | 8/2010 | Grohman et al. |
| 2010/0283579 A1 | 11/2010 | Kraus et al. |
| 2010/0321151 A1 | 12/2010 | Matsuura et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0150432 A1 | 6/2011 | Paul et al. |
| 2011/0156862 A1* | 6/2011 | Langer ............... G08B 21/24 340/4.37 |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0295396 A1* | 12/2011 | Chinen ............... G10L 25/00 700/94 |
| 2012/0019388 A1 | 1/2012 | Kates et al. |
| 2012/0047532 A1 | 2/2012 | McCarthy |
| 2012/0059495 A1* | 3/2012 | Weiss ............... G06F 17/30743 700/94 |
| 2012/0069246 A1 | 3/2012 | Thornberry et al. |
| 2012/0094696 A1 | 4/2012 | Ahn et al. |
| 2012/0124456 A1 | 5/2012 | Perez et al. |
| 2012/0154108 A1 | 6/2012 | Sugaya |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0316876 A1 | 12/2012 | Jang et al. |
| 2012/0326835 A1 | 12/2012 | Cockrell et al. |
| 2013/0046800 A1 | 2/2013 | Assi et al. |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0124192 A1 | 5/2013 | Lindmark et al. |
| 2013/0138757 A1 | 5/2013 | Ferron |
| 2013/0152139 A1 | 6/2013 | Davis et al. |
| 2013/0204408 A1 | 8/2013 | Thiruvengada et al. |
| 2013/0267383 A1 | 10/2013 | Watterson |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0095684 A1 | 4/2014 | Nonaka et al. |
| 2014/0101465 A1 | 4/2014 | Wang et al. |
| 2014/0142724 A1 | 5/2014 | Park et al. |
| 2014/0160360 A1 | 6/2014 | Hsu et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0215505 A1 | 7/2014 | Balasubramanian et al. |
| 2014/0218517 A1 | 8/2014 | Kim et al. |
| 2014/0266669 A1 | 9/2014 | Fadell et al. |
| 2014/0266684 A1 | 9/2014 | Poder et al. |
| 2014/0310075 A1 | 10/2014 | Ricci |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0029096 A1 | 1/2015 | Ishihara |
| 2015/0054910 A1 | 2/2015 | Offen et al. |
| 2015/0066173 A1 | 3/2015 | Ellis et al. |
| 2015/0084770 A1 | 3/2015 | Xiao et al. |
| 2015/0106866 A1 | 4/2015 | Fujita |
| 2015/0143408 A1 | 5/2015 | Sallas |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0198941 A1 | 7/2015 | Pederson |
| 2015/0281824 A1 | 10/2015 | Nguyen et al. |
| 2015/0309487 A1 | 10/2015 | Lyman |
| 2015/0341599 A1 | 11/2015 | Carey |
| 2016/0063854 A1 | 3/2016 | Burton et al. |
| 2016/0066046 A1 | 3/2016 | Mountain |
| 2016/0091471 A1 | 3/2016 | Benn |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |
| 2016/0203700 A1 | 7/2016 | Bruhn et al. |
| 2016/0286327 A1 | 9/2016 | Marten |
| 2016/0334811 A1 | 11/2016 | Marten |
| 2016/0335423 A1 | 11/2016 | Beals |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2016/034880 A1 | 3/2016 |
| WO | 2016/066442 A1 | 5/2016 |
| WO | 2016066399 A1 | 5/2016 |
| WO | 2016/182696 A1 | 11/2016 |

OTHER PUBLICATIONS

U.S. Appl. No. 12/700,310, filed Feb. 4, 2010 Final Office Action mailed Oct. 26, 2015, 19 pages.

U.S. Appl. No. 14/485,188, filed Sep. 12, 2014, Pre-Interview First Office Action mailed Oct. 1, 2015, 10 pages.

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.

International Search Report and Written Opinion for PCT/EP2015/070286 mailed Nov. 5, 2015, 13 pages.

International Search Report and Written Opinion for PCT/GB2015/052544 mailed Oct. 6, 2015, 10 pages.

International Search Report and Written Opinion for PCT/GB2015/052457 mailed Nov. 13, 2015, 11 pages.

International Search Report and Written Opinion for PCT/EP2015/073299 mailed Jan. 4, 2016, 12 pages.

International Search Report and Written Opinion for PCT/EP2015/073936 mailed Feb. 4, 2016, all pages.

(56) References Cited

OTHER PUBLICATIONS

U.S. Appl. No. 14/107,132, filed Dec. 16, 2013, Final Rejection mailed Dec. 16, 2015, 32 pages.
U.S. Appl. No. 14/485,188, filed Sep. 12, 2014, Final Rejection mailed Feb. 23, 2016, 22 pages.
U.S. Appl. No. 14/567,348, filed Dec. 11, 2014, Preinterview first office action mailed Jan. 20, 2016, 23 pages.
U.S. Appl. No. 14/470,352, filed Aug. 27, 2014 Final Office Action mailed Mar. 17, 2016, all pages.
U.S. Appl. No. 14/567,765, filed Dec. 11, 2014, Preinterview first office action mailed Apr. 8, 2016, 30 pages.
U.S. Appl. No. 14/577,717, filed Dec. 19, 2014, Preinterview first office action mailed Apr. 4, 2016, 29 pages.
U.S. Appl. No. 14/584,075, filed Dec. 29, 2014, Non-Final Rejection mailed Apr. 1, 2016, 40 pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart_tv_television_apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
"Do you want to know how to find water leaks? Use a Bravedo Water Alert Flow Monitor to find out!", Bravedo.com, accessed Dec. 16, 2014, 10 pages. Retrieved from http://bravedo.com/.
"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/.../New_IBC-IFC_Code_Language.pdf.
"Introduction to Ultrasonic Doppler Flowmeters," Omega Engineering inc., accessed on Dec. 16, 2014, 3 pages. Retrieved from http://www.omega.com/prodinfo/ultrasonicflowmeters.html.
"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
International Search Report and Written Opinion for PCT/EP2011/051608 mailed on May 30, 2011, 13 pages.
International Preliminary Report on Patentability for PCT/EP2011/051608 mailed Aug. 16, 2012, 8 pages.
International Search Report and Written Opinion for PCT/US2014/053876 mailed Nov. 26, 2014, 8 pages.
International Search Report and Written Opinion for PCT/US2014/055441 mailed Dec. 4, 2014, 10 pages.
International Search Report and Written Opinion for PCT/US2014/055476 mailed Dec. 30, 2014, 10 pages.
Mexican Institute of Industrial Property Notice of Allowance dated Feb. 10, 2014, for Mex. Patent Appln No. MX/a/2012/008882, 1 page.
Mexican Institute of Industrial Property Office Action dated Nov. 1, 2013, for Mex. Patent Appln No. MX/a/2012/008882 is not translated into English, 3 pages.
U.S. Appl. No. 12/700,310, filed Feb. 4, 2010, Office Action mailed May 4, 2012, 15 pages.
U.S. Appl. No. 12/700,310, filed Feb. 4, 2010, Final Office Action mailed Oct. 10, 2012, 16 pages.
U.S. Appl. No. 12/700,310, filed Feb. 4, 2010 Non-Final Office Action mailed Apr. 1, 2013, 16 pages.
U.S. Appl. No. 12/700,310, filed Feb. 4, 2010 Non-Final Office Action mailed Oct. 15, 2013, 15 pages.
U.S. Appl. No. 12/700,310, filed Feb. 4, 2010 Final Office Action mailed Feb. 28, 2014, 17 pages.
U.S. Appl. No. 12/700,310, filed Feb. 4, 2010 Non-Final Office Action mailed Aug. 14, 2014, 18 pages.
U.S. Appl. No. 12/700,310, filed Feb. 4, 2010 Non-Final Office Action mailed Mar. 11, 2015, 35 pages.
U.S. Appl. No. 12/700,408, filed Feb. 4, 2010, Notice of Allowance mailed Jul. 28, 2012, 8 pages.
U.S. Appl. No. 13/680,934, filed Nov. 19, 2012,Non-Final Office Action mailed Oct. 2, 2013, 7 pages.
U.S. Appl. No. 13/680,934, filed Nov. 19, 2012,Final Office Action mailed Feb. 10, 2014, 13 pages.
U.S. Appl. No. 13/680,934, filed Nov. 19, 2012,Notice of Allowance mailed Apr. 30, 2014, 9 pages.
U.S. Appl. No. 13/680,934, filed Nov. 19, 2012, Notice of Allowance mailed Jul. 25, 2014, 12 pages.
U.S. Appl. No. 14/107,132, filed Dec. 16, 2013 Non Final Office Action mailed May 27, 2015, 26 pages.
U.S. Appl. No. 14/485,188, filed Sep. 12, 2014 Pre-Interview First Office Action mailed Jul. 29, 2015, 20 pages.
U.S. Appl. No. 14/470,352, filed Aug. 27, 2014 Non Final Office Action mailed Aug. 26, 2016, all pages.
U.S. Appl. No. 14/107,132, filed Dec. 16, 2013, Non Final Office Action mailed Jul. 18, 2016, all pages.
U.S. Appl. No. 14/567,783, filed Dec. 11, 2014, Non Final Rejection mailed Aug. 23, 2016, all pages.
U.S. Appl. No. 12/700,310, filed Feb. 4, 2010 Notice of Allowance mailed Nov. 8, 2016, all pages.
U.S. Appl. No. 14/567,765, filed Dec. 11, 2014, First Action interview mailed Oct. 18, 2016, all pages.
U.S. Appl. No. 14/584,075, filed Dec. 29, 2014, Final Rejection mailed Oct. 6, 2016, all pages.
U.S. Appl. No. 14/566,977, filed Dec. 11, 2014, Non Final Rejection mailed Oct. 3, 2016, all pages.
U.S. Appl. No. 14/567,754, filed Dec. 11, 2014, Non Final Rejection mailed Nov. 4, 2016, all pages.
U.S. Appl. No. 14/567,770, filed Dec. 11, 2014, Non Final Rejection mailed Nov. 4, 2016, all pages.
U.S. Appl. No. 14/671,299, filed Mar. 27, 2015, Non Final Rejection mailed Oct. 28, 2016, all pages.
U.S. Appl. No. 14/476,377, filed Sep. 3, 2014, Non-Final Rejection mailed Nov. 7, 2016, all pages.
Office Action for EP14868928.4 dated Sep. 23, 2016, all pages.
U.S. Appl. No. 14/470,352, filed Aug. 27, 2014 Notice of Allowance mailed Dec. 2, 2016, all pages.
U.S. Appl. No. 15/050,958, filed Feb. 23, 2016 Notice of Allowance mailed Dec. 6, 2016, all pages.
U.S. Appl. No. 15/289,395, filed Oct. 10, 2016 Non-Final Rejection mailed Dec. 2, 2016, all pages.
U.S. Appl. No. 14/485,188, filed Sep. 12, 2014, Final Rejection mailed Nov. 25, 2016, 22 pages.
International Search Report and Written Opinion for PCT/US2016/028126 mailed Jun. 3, 2016, all pages.
U.S. Appl. No. 12/700,310, filed Feb. 4, 2010 Non-Final Office Action mailed Jun. 16, 2016, 30 pages.
U.S. Appl. No. 14/528,739, filed Oct. 30, 2014 Notice of Allowance mailed Jun. 23, 2016, 34 pages.
U.S. Appl. No. 14/485,188, filed Sep. 12, 2014, Non-Final Rejection mailed Jun. 17, 2016, 29 pages.
U.S. Appl. No. 14/710,331, filed May 12, 2015, Non-Final Rejection mailed May 20, 2016, 42 pages.

(56) References Cited

OTHER PUBLICATIONS

International Preliminary Report on Patentability for PCT/US2014/055441 issued Jun. 14, 2016, 8 pages.
International Preliminary Report on Patentability for PCT/US2014/053876 issued Jun. 14, 2016, 7 pages.
International Preliminary Report on Patentability for PCT/US2014/055476 issued Jun. 14, 2016, 9 pages.

* cited by examiner

AUTOMATIC MUTING

BACKGROUND OF THE INVENTION

Audio output from an electronic device may be covered up by various sounds coming from other devices in its vicinity. For example, a phone may ring during a television show, but the ring may not be heard by a television viewer if the show is louder than the ring. In that case, the viewer may miss the phone call. In other cases, the television viewer may be engrossed in watching the show and unaware of the presence of other events, such as the ringing. This application is intended to address these and other issues, and to provide related advantages.

BRIEF SUMMARY OF THE INVENTION

In general, the systems and methods disclosed herein are directed to controlling electronic devices, and more specifically, to controlling volume levels of electronic devices.

In one aspect, the present disclosure provides a method for adjusting a volume level of a home automation device. The method may include receiving, by a television receiver, a user input indicative of triggering a remote find operation to locate a remote control. The method may include, in response to the user input, sending, by the television receiver, a remote find instruction to the remote control, whereby the remote find instruction triggers the remote control to emit a sound. Further, the method may include, in response to the user input, sending, by the television receiver, a temporary quiet instruction to the home automation device. The quiet instruction may initiate a lowering of the volume level of the home automation device while the remote control is emitting the sound as a part of the remote find operation.

Various embodiments of the present method may include one or more of the following features. The method may include, in response to the user input, determining, by the television receiver, a sound level being output by the home automation device. The method may include comparing, by the television receiver, the sound level to a threshold sound level, and generating, by the television receiver, the quiet instruction based on the comparison. In another aspect, the method may include, in response to the user input, determining, by the television receiver, one or more additional home automation devices that are currently outputting sound, and sending, by the television receiver, additional temporary quiet instructions to the determined additional home automation devices. The method may include, in response to the user input, determining, by the television receiver, one or more additional home automation devices that are currently outputting sound above a threshold level, and sending, by the television receiver, additional temporary quiet instructions to the determined additional home automation devices that are currently outputting sound above the threshold level.

Other embodiments of the present method may include one or more of the following features. The method may include determining, by the television receiver, a defined period of time has passed since sending the remote find instruction to the remote control, and based on the determination, sending, by the television receiver, a resume instruction to the home automation device to return the lowered volume level to an original volume level. The method may include, based on the determination, sending, by the television receiver, a cease instruction to the remote control to stop emitting a sound. Further, the method may include receiving, by the television receiver, an indication from the remote control to cease the remote find operation, and in response to the indication, sending, by the television receiver, a resume instruction to the home automation device to return the lowered volume level to an original volume level. The quiet instruction may initiate the lowering of the volume level of the home automation device to a muted volume level.

In another aspect, a system for adjusting a volume level of a home automation device includes a computer system, whereby the computer system may be configured to receive a user input indicative of triggering a remote find operation to locate a remote control. The computer system may be configured to, in response to the user input, send a remote find instruction to the remote control, whereby the remote find instruction triggers the remote control to emit a sound. The computer system may be configured to, in response to the user input, send a temporary quiet instruction to the home automation device. The quiet instruction may initiate a lowering of the volume level of the home automation device while the remote control is emitting the sound as a part of the remote find operation.

Various embodiments of the present system may include one or more of the following features. The computer system may be configured to, in response to the user input, determine a sound level being output by the home automation device, compare the sound level to a threshold sound level, and generate the quiet instruction based on the comparison. The computer system may be configured to, in response to the user input, determine one or more additional home automation devices that are currently outputting sound, and send additional temporary quiet instructions to the determined additional home automation devices. The computer system may be configured to, in response to the user input, determine one or more additional home automation devices that are currently outputting sound above a threshold level, and send additional temporary quiet instructions to the determined additional home automation devices that are currently outputting sound above the threshold level.

Other embodiments of the present system may include one or more of the following features. The computer system may be configured to determine a defined period of time has passed since sending the remote find instruction to the remote control, and based on the determination, send a resume instruction to the home automation device to return the lowered volume level to an original volume level. The computer system may be configured to, based on the determination, send a cease instruction to the remote control to stop emitting a sound. The computer system may be configured to receive an indication from the remote control to cease the remote find operation, and in response to the indication, send a resume instruction to the home automation device to return the lowered volume level to an original volume level. The quiet instruction may initiate the lowering of the volume level of the home automation device to a muted volume level.

In yet another aspect, a computer-readable medium having instructions stored thereon for adjusting a volume level of a home automation device is provided, whereby the instructions are executable by one or more processors for receiving a user input indicative of triggering a remote find operation to locate a remote control. The instructions are executable by one or more processors for, in response to the user input, sending a remote find instruction to the remote control, whereby the remote find instruction triggers the remote control to emit a sound, and in response to the user input, sending a temporary quiet instruction to the home automation device. The quiet instruction may initiate a lowering of the volume level of the home automation device while the remote control is emitting the sound as a part of the remote find operation.

Various embodiments of the present system may include one or more of the following features. The instructions are executable by one or more processors for, in response to the user input, determining a sound level being output by the home automation device. Further, the instructions are executable by one or more processors for comparing the sound level to a threshold sound level, and generating the quiet instruction based on the comparison. The instructions are executable by one or more processors for, in response to the user input, determining one or more additional home automation devices that are currently outputting sound, and sending additional temporary quiet instructions to the determined additional home automation devices. The instructions are executable by one or more processors for determining a defined period of time has passed since sending the remote find instruction to the remote control, and based on the determination, sending a resume instruction to the home automation device to return the lowered volume level to an original volume level.

BRIEF DESCRIPTION OF THE DRAWINGS

The present invention is described in conjunction with the appended figures.

Figure 1:
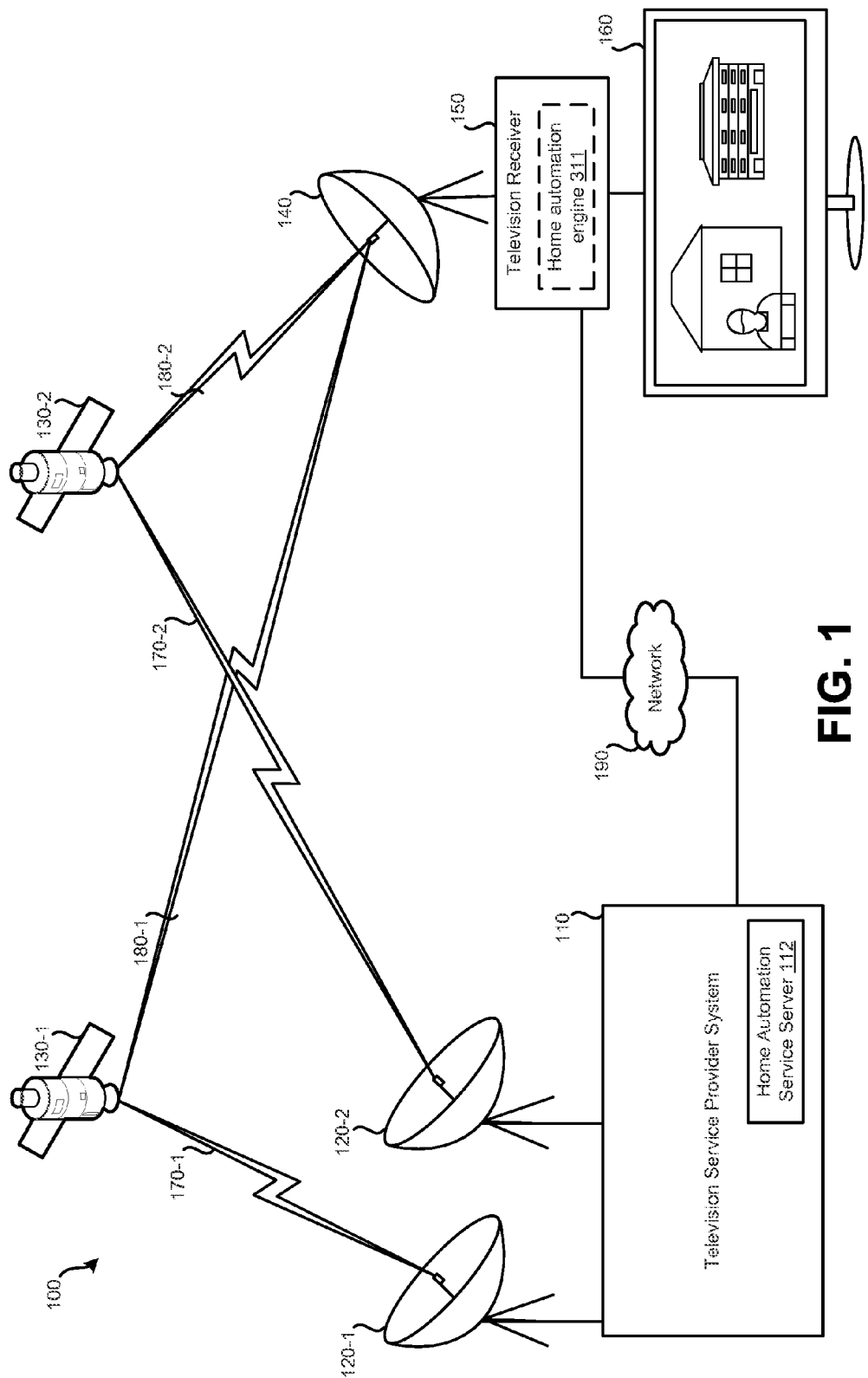
FIG. 1 shows an embodiment of a television service provider system.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

In general, the systems and methods disclosed herein provide for adjusting a volume level of an electronic device, and more specifically, for adjusting the volume level of sound being output from the electronic device when presence of another sound is detected. Merely by way of example, upon detection of a desirable sound, such as a remote-control beeping during a remote-control-find-operation, a television and/or speakers outputting other sounds may be muted and/or otherwise turned down to prevent the desired sound from being masked and therefore missed. In some aspects, the systems and methods disclosed herein may be implemented in conjunction with a home automation system, whereby multiple devices are in operative communication with one another via various home automation network protocols, engines, and so on. Such home automation features may be provided for by a television, television receiver, and/or an overlay device which may be in operative communication with the television receiver, to generate and send volume-level adjustment instructions to multiple electronic devices via the network. Other examples are possible. For instance, devices may receive volume adjustment instructions via other wired and/or wireless communication channels, and/or a combination of such channels.

In practice, the present systems and methods may offer various benefits. For example, present systems and methods may provide automatic muting and/or volume adjustments upon detection of specific, predetermined events. In an example described hereinbelow, the systems and methods may aid in a remote control find operation for locating a lost remote control, or any other electronic device in which an audial emitter, finder, and/or locator feature is provided. In the present example, a user may press a button on the television receiver, overlay device, and/or television to relay instructions to the remote control to instantiate a beeping or other sound output, which may last until the find operation is turned off by a user via a button on the remote control, television receiver, television, and/or overlay device. In some aspects, initiation of the find operation may instantiate other alerts, alternatively and/or additionally, such as flashing lights being emitted from the remote control. The present systems and methods may aid the find operation by lowering volume levels of other devices while the desired sound is being output. It is noted that any context may be contemplated for implementing the automatic volume adjustments described herein, and that any specific examples being provided are not intended to be limiting.

FIG. 1 illustrates an embodiment of a satellite television distribution system 100. While a home automation system may be incorporated with various types of television receivers, various embodiments may be a part of a satellite-based television distribution system. Cable, IP-based, wireless and broadcast focused systems are also possible. Satellite television distribution system 100 may include: television service provider system 110, satellite transmitter equipment 120, satellites 130, satellite dish 140, television receiver 150, home automation service server 112, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

As shown in FIG. 1, television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Still referring to FIG. 1, satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may be also be relayed to television receiver via one or more transponder streams. For instance, home automation functions may be requested by and/or pushed to the television receiver 150 from the television service provider system 110.

As shown in FIG. 1, multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Further, it is contemplated that multiple home automation functions may be transmitted in similar fashion.

Still in reference to FIG. 1, satellite dish 140 may be a piece of user equipment that is used to receive transponder streams from one or more satellites, such as satellites 130. Satellite dish 140 may be provided to a subscriber for use on a subscription basis to receive television channels and/or home automation functions provided by the television service provider system 110 and/or specifically, the home automation service server 112 of the provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time. Merely by way of example, multiple television channels and/or multiple home automation functions may be received concurrently.

Figure 2:
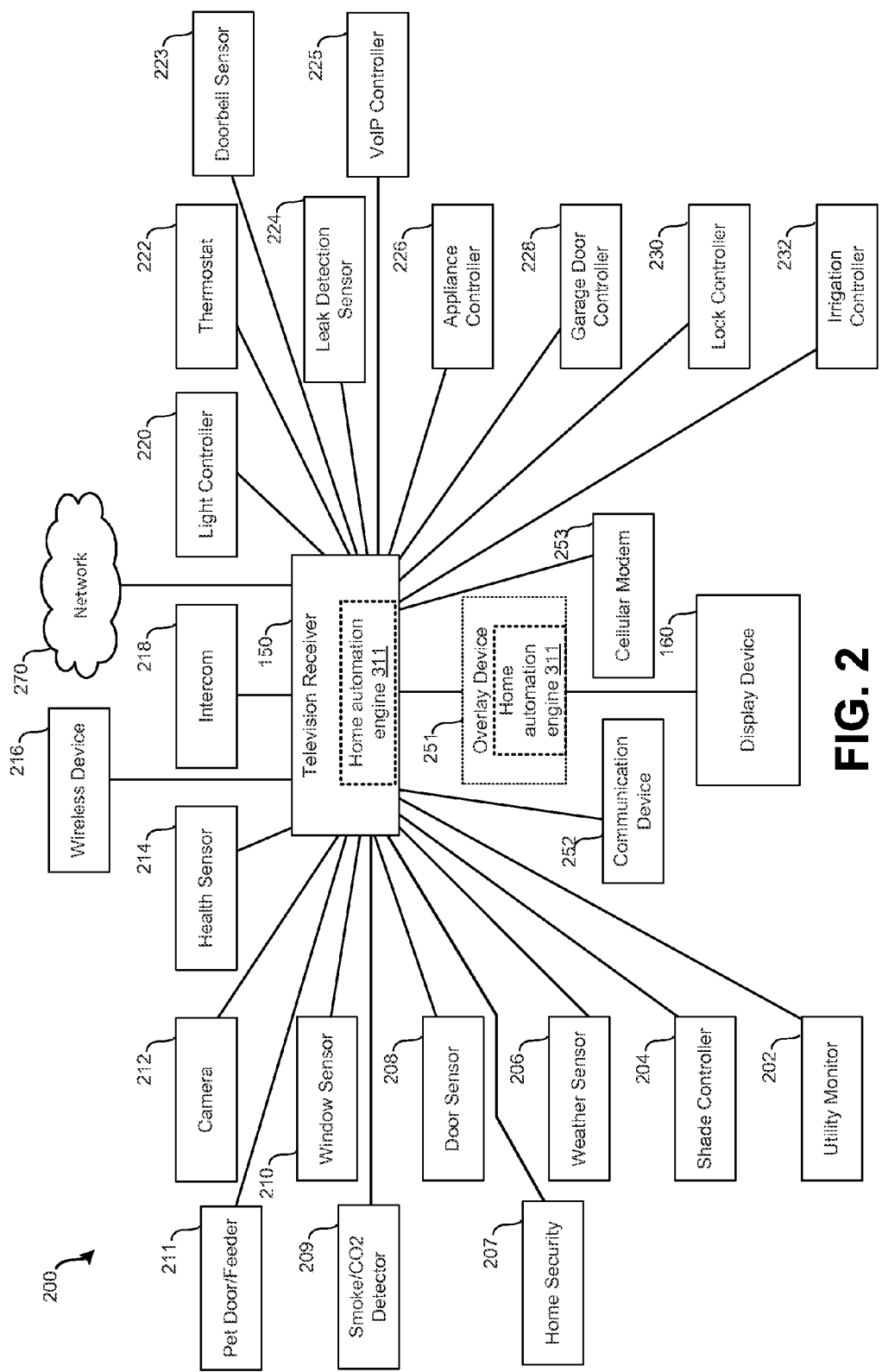
FIG. 2 shows an embodiment of a home automation system hosted by a television receiver.

FIG. 1 further illustrates one or more television receivers in communication with satellite dish 140. Television receivers may be configured to decode signals received from satellites 130 via satellite dish 140 for output and presentation via a display device, such as display device 160. Similarly, such television receivers may decode signals received for any home automation devices. For instance, a home automation engine 311, as described further below, may decode such signals. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 described below provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include the home automation engine 311, as detailed in relation to FIG. 3.

Referring again to FIG. 1, display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

As further illustrated in FIG. 1, uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and/or home automation functions. For example, uplink signal 170-1 may contain a first group of television channels and/or home automation functions, while uplink signal 170-2 contains a second group of television channels and/or home automation functions. Each of these television channels and/or home automation functions may be scrambled such that unauthorized persons are prevented from accessing the television channels.

As shown in FIG. 1, downlink signal 180-1 represents a signal between satellite 130-1 and satellite dish 140. Downlink signal 180-2 represents a signal between satellite 130-2 and satellite dish 140. Each of the downlink signals 180 may contain one or more different television channels and/or home automation functions, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels and/or home automation functions, while downlink signal 180-2 may be a second transponder stream containing a different group of television channels and/or home automation functions. In addition to or instead of containing television channels, a transponder stream can be used to transmit on-demand content to television receivers, including PPV content (which may be stored locally by the television receiver until output for presentation).

FIG. 1 further illustrates downlink signal 180-1 and downlink signal 180-2, being received by satellite dish 140 and distributed to television receiver 150. For a first group of television channels and/or home automation functions, satellite dish 140 may receive downlink signal 180-1 and for a second group of channels and/or home automation functions, downlink signal 180-2 may be received. Television receiver 150 may decode the received transponder streams. As such, depending on which television channels and/or home automation functions are desired to be presented or stored, various transponder streams from various satellites may be received, descrambled, and decoded by television receiver 150.

Further shown in FIG. 1, network 190, which may include the Internet, may allow for bidirectional communication between television receiver 150 and television service provider system 110, such as for home automation related services provided by home automation service server 112. In addition or in alternate to network 190, a telephone (e.g., landline) or cellular connection may be used to enable communication between television receiver 150 and television service provider system 110.

Turning now to FIG. 2, an embodiment of a home automation system 200 hosted by a television receiver is illustrated. Television receiver 150 may represent the television receiver of FIG. 1. While television receiver 150 may be configured to receive television programming from a satellite-based television service provider, it should be understood that in other embodiments, other forms of television service provider networks may be used, such as an IP-based network (e.g., fiber network), a cable based network, a wireless broadcast-based network, etc.

As shown in FIG. 2, television receiver 150 may be configured to communicate with multiple in-home home automation devices. The devices with which television receiver 150 communicates may use different communication standards or protocols. For instance, one or more devices may use a ZigBee® communication protocol while one or more other devices communicate with the television receiver using a Z-Wave® communication protocol. Other forms of wireless communication may be used by devices and the television receiver 150. For instance, television receiver 150 and one or more devices may be configured to communicate using a wireless local area network, which may use a communication protocol such as 802.11.

Referring to FIG. 2, in some embodiments, a separate device may be connected with television receiver 150 to enable communication with home automation devices. For instance, communication device 252 may be attached to television receiver 150. Communication device 252 may be in the form of a dongle. Communication device 252 may be configured to allow for Zigbee®, Z-Wave®, and/or other forms of wireless communication. The communication device may connect with television receiver 150 via a USB port or via some other type of (wired) communication port. Communication device 252 may be powered by the television receiver 150 or may be separately coupled with a power source. In some embodiments, television receiver 150 may be enabled to communicate with a local wireless network and may use communication device 252 in order to communicate with devices that use a ZigBee® communication protocol, Z-Wave® communication protocol, and/or some other home wireless communication protocols.

Still referring to FIG. 2, communication device 252 may also serve to allow additional components to be connected with television receiver 150. For instance, communication device 252 may include additional audio/video inputs (e.g., HDMI), component, and/or composite input to allow for additional devices (e.g., Blu-ray players) to be connected with television receiver 150. Such connection may allow video from such additional devices to be overlaid with home automation information. Merely by way of example, whether home automation information is overlaid onto video may be triggered based on a user's press of a remote control button.

As shown in FIG. 2, regardless of whether television receiver 150 uses communication device 252 to communicate with home automation devices, television receiver 150 may be configured to output home automation information for presentation to a user via display device 160. Such information may be presented simultaneously with television programming received by television receiver 150, such as via system 100 of FIG. 1 described above. Television receiver 150 may also, at a given time, output only television programming or only home automation information based on a user's preference. The user may be able to provide input to television receiver 150 to control the home automation system hosted by television receiver 150 or by overlay device 251, as detailed below.

Still referring to FIG. 2, in some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 251. Overlay device 251 may be configured to overlay information, such as home automation information, onto a signal to be visually presented via display device 160, such as a television. In some embodiments, overlay device 251 may be coupled between television receiver 150, which may be in the form of a set top box, and display device 160, which may be a television. In such embodiments, television receiver 150 may receive, decode, descramble, decrypt, store, and/or output television programming and/or home automation functions. Television receiver 150 may output a signal, such as in the form of an HDMI signal. Rather than be directly input to display device 160, the output of television receiver 150 may be input to overlay device 251. Overlay device 251 may receive the video and/or audio output from television receiver 150. Overlay device 251 may add additional information to the video, audio and/or home automation function signal received from television receiver 150. The modified video and/or audio signal may be output to display device 160 for presentation. In some embodiments, overlay device 251 has an HDMI input and an HDMI output, with the HDMI output being connected to display device 160. To be clear, while FIG. 2 illustrates lines illustrating communication between television receiver 150 and various devices, it should be understood that such communication may exist, in addition or in alternate via communication device 252 and/or with overlay device 251.

Referring again to FIG. 2, in some embodiments, television receiver 150 may be used to provide home automation functionality while overlay device 251 may be used to present information via display device 160. It should be understood that the home automation functionality detailed herein in relation to a television receiver may alternatively be provided via overlay device 251. In some embodiments, overlay device 251 may provide home automation functionality and be used to present information via display device 160. Using overlay device 251 to present automation information via display device 160 may have additional benefits. For instance, multiple devices may provide input video to overlay device 251. For instance, television receiver 150 may provide television programming to overlay device 251, a DVD/Blu-Ray player may provide video overlay device 251, and a separate internet-TV device may stream other programming to overlay device 251. Regardless of the source of the video/audio, overlay device 251 may output video and/or audio that has been modified to include home automation information, such as a pop-up overlay with a prompt message, and output to display device 160. As such, in such embodiments, regardless of the source of video/audio, overlay device 251 may modify the audio/video to include home automation information and, possibly, solicit for user input. For instance, in some embodiments overlay device 251 may have four video inputs (e.g., four HDMI inputs) and a single video output (e.g., an HDMI output). In other embodiments, such overlay functionality may be part of television receiver 150. As such, a separate device, such as a Blu-ray player may be connected with a video input of television receiver 150, thus allowing television receiver 150 to overlay home automation information when content from the Blu-Ray player is being output to display device 160.

Still referring to FIG. 2, regardless of whether television receiver 150 is itself configured to provide home automation functionality and output home automation input for display via display device 160 or such home automation functionality is provided via overlay device 251, home automation information may be presented by display device 160 while television programming is also being presented by display device 160. For instance, home automation information may be overlaid or may replace a portion of television programming (e.g., broadcast content, stored content, on-demand content, etc.) presented via display device 160. Merely by way of example, while television programming is being presented (e.g., a television show on scuba diving), the display is augmented with information related to home automation. This television show may represent broadcast programming, recorded content, on-demand content, or some other form of content. In one example, the presented home automation information is related to motion being detected by a camera at a front door of a location. Such augmentation of the television programming may be performed directly by television receiver 150 (which may or may not be in communication with communication device 252) or overlay device 251 connected with television receiver 150 and display device 160. Such augmentation may result in solid or partially transparent graphics being overlaid onto television programming (or other forms of video) output by television receiver 150. Overlay device 251 or television receive 150 may be configured to add or modify sound to television programming. In addition or in alternate, a graphic may be displayed. In other embodiments, camera data (e.g., nanny camera data) and/or associated sound or motion sensors may be integrated in the system and overlaid or otherwise made available to a user.

Still in reference to FIG. 2, such presented home automation information may request user input. For instance, a user, via controls of television receiver 150 (e.g., a remote control) or controls of overlay device 251, can specify whether video from a camera at the front door should be presented, not presented, or if future notifications related to such motion such be ignored. If ignored, this may be for a predefined period of time, such as an hour, or until the television receiver 150 or overlay device 251 is powered down and powered back on. Ignoring of video may be particularly useful if motion or some other event is triggering the presentation of video that is not interesting to a viewer of display device 160 (or a wireless device).

As shown in FIG. 2, television receiver 150 or overlay device 251 may be configured to communicate with one or more wireless devices, such as wireless device 216. Wireless device 216 may represent a tablet computer, cellular phone, laptop computer, remote computer, or some other device through which a user may desire to control home automation settings and view home automation information. Such a device also need not be wireless, such as a desktop computer. Television receiver 150, communication device 252, or overlay device 251 may communicate directly with wireless device 216, or may use a local wireless network, such as network 270. Wireless device 216 may be remotely located and not connected with a same local wireless network. Via the internet, television receiver 150 or overlay device 251 may be configured to transmit a notification to wireless device 216 regarding home automation information. For instance, in some embodiments, a third-party notification server system, such as the notification server system operated by Apple®, may be used to send such notifications to wireless device 216.

Further shown in FIG. 2, in some embodiments, a location of wireless device 216 may be monitored. For instance, if wireless device 216 is a cellular phone, when its position indicates it has neared a door, the door may be unlocked. A user may be able to define which home automation functions are controlled based on a position of wireless device 216. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 150.

Still referring to FIG. 2, in some embodiments, little to no setup of network 270 may be necessary to permit television receiver 150 to stream data out to the Internet. For instance, television receiver 150 and network 270 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Still referring to FIG. 2, as an example of how wireless device 216 may be used in conjunction with television receiver 150 or overlay device 251 for controlling a home automation system, a wireless device 216 may be in communication with television receiver 150 serving as the host of a home automation system. At approximately a same time that the home automation information is presented via display device 160 (assuming it is turned on), similar information may be sent to wireless device 216, such as via a third-party notification server or directly from television receiver 150 or overlay device 251 via a local wireless network. A user of wireless device 216 can specify whether video from a camera at the front door should be presented by wireless device 216, not presented, or if future notifications related to such motion such be ignored. If ignored, this may be for a predefined period of time, such as an hour or some other predefined or user-selected period of time. In this way, a user interface of the wireless device 216 may correspond to an overlay of the home automation information and/or prompt appearing on the display device 160.

Referring again to FIG. 2, wireless device 216 may serve as an input device for television receiver 150. For instance, wireless device 216 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device, such as lighting commands, security alarm settings and door lock commands. While wireless device 216 may be used as the input device for typing text, television receiver 150 may output for display text to display device 160.

Still referring to FIG. 2, wireless device 216 may be configured to store a software model of home automation system intended to mirror the software model stored by television receiver 150, which is hosting the home automation system. For instance, such a software model may allow wireless device 216 to view, communicate with, and/or interact with various home automation devices. Such a software model may indicate the state of various home automation devices. When wireless device 216 is not in communication with television receiver 150, changes to the home automation model made at television receiver 150 may not be known to wireless device 216. A history list maintained by television receiver 150 and/or a synchronization point numerical value, whereby each change to the home automation model by television receiver 150 is assigned a value and synchronized at a later point with the wireless device 216, may be implemented. In another aspect, the wireless device 216 may be utilized by a user for entering and/or confirming rules and other settings of the home automation system, and such settings may be synchronized or otherwise communicated with the television receiver 150.

Further shown in FIG. 2, in some embodiments, a cellular modem 253 may be connected with either overlay device 251 or television receiver 150. Cellular modem 253 may be useful if a local wireless network is not available. For instance, cellular modem 253 may permit access to the internet and/or communication with a television service provider. Communication with a television service provider, such as television service provider system 110 of FIG. 1, may also occur via a local wireless or wired network connected with the Internet. In some embodiments, information for home automation purposes may be transmitted by television service provider system 110 to television receiver 150 or overlay device 251 via the television service provider's distribution network, which may include the use of satellites 130.

As shown in FIG. 2, various home automation devices may be in communication with television receiver 150 or overlay device 251. Such home automation devices may use disparate communication protocols. Such home automation devices may communicate with television receiver 150 directly or via communication device 252. Such home automation devices may be controlled by a user and/or have a status viewed by a user via display device 160 and/or wireless device 216. Such home automation device may include one or more of the following, as discussed below.

As shown in FIG. 2, such home automation devices may include one or more cameras, such as camera 212. Camera 212 may be either indoors or outdoors and may provide a video and, possibly, audio stream which can be presented via wireless device 216 and/or display device 160. Video and/or audio from camera 212 may be recorded by overlay device 251 or television receiver 150 upon an event occurring, such as motion being detected by camera 212. Video and/or audio from camera 212 may be continuously recorded such as in the form of a rolling window, thus allowing a period of time of video/audio to be reviewed by a user from before a triggering event and after the triggering event. Video may be recorded on a storage local to overlay device 251 or television receiver 150, or may be recorded and or storage on external storage devices, such as a network attached storage device. In some embodiments, video may be transmitted across the local and/or wide area network to other storage devices upon occurrence of a trigger event for later playback. For initial setup, a still from camera 212 may be captured by and stored by television receiver 150 for subsequent presentation as part of a user interface via display device 160 such that the user can determine which camera (if multiple cameras are present) is being set up and/or later accessed.

For instance, as shown in FIG. 2, video and, possibly, audio from camera 212 may be available live for viewing by a user via overlay device 251 or television receiver 150. Such video may be presented simultaneously with television programming being presented. In some embodiments, video may only be presented if motion is detected by camera 212, otherwise video from camera 212 may not be presented by the display device presenting television programming. Also, such video (and, possibly, audio) from camera 212 may be recorded by television receiver 150 or overlay device 251. Such video may be recorded based upon a timer configured by a user. For instance, camera 212 may be incorporated into an electronic programming guide (EPG) output for display by television receiver 150. For instance, camera 212 may be presented as a "channel" as part of the EPG along with other television programming channels. A user may be permitted to select the channel associated with camera 212 for presentation via display device 160 (or wireless device 216). The user may also be permitted to set a timer to record the channel of camera 212 for a user-defined period of time on a user-defined date. Such recording may not be constrained by the rolling window associated with a triggering event being detected. In some embodiments, video from camera 212 may be backed up to a remote storage device, such as cloud-based storage hosted by home automation service server 112. Other data may also be cached to the cloud, such as configuration settings. Thus, if the television receiver 150 or overlay device 251 malfunctions, then a new device may be installed and the configuration data loaded onto the device from the cloud.

Further shown in FIG. 2, window sensor 210 and door sensor 208 may transmit data to television receiver 150 (possibly via communication device 252) or overlay device 251 that indicates the status of a window or door, respectively. Such status may indicate open or closed. When a status change occurs, the user may be notified as such via wireless device 216 or display device 160. Further, a user may be able to view a status screen to view the status on one or more window sensors and/or one or more door sensors throughout the location. Window sensor 210 and/or door sensor 208 may have integrated glass break sensors to determine if glass has been broken.

Still shown in FIG. 2, one or more smoke and/or $CO_2$ detectors 209 may be integrated as part of a home automation system. As such, alerts as to whether a fire or $CO_2$ has been detected can be sent to television receiver 150, wireless device 216, and/or emergency first responders. Further, television receiver 150 and/or wireless device 216 may be used to disable false alarms. One or more sensors may be integrated or separate to detect gas leaks, radon, or various other dangerous situations.

Still referring to FIG. 2, pet door and/or feeder 211 may allow for pet related functionality to be integrated with television receiver 150. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door via wireless device 150 and/or wireless device 216.

Still shown in FIG. 2, weather sensor 206 may allow television receiver 150 or overlay device 251 to receive, identify, and/or output various forms of environmental data, including temperature, humidity, wind speed, barometric pressure, etc. Television receiver 150 or overlay device 251 may allow for control of one or more shades, such as window, door, and/or skylight shades, within a house. Shade controller 204 may respond to commands from television receiver 150 or overlay device 251 and may provide status updates (e.g., shade up, shade 50% up, shade down, etc.).

As shown in FIG. 2, in some embodiments, television receiver 150 may receive and notify a user of the status of electrical appliances such as refrigerators and dishwashers within the house. The television receiver 150 may be linked to the appliances and present a notification message to the user through any device that the user is using at the time, such as a tablet computer, mobile phone or thin client. U.S. patent application Ser. No. 12/700,310, filed Feb. 4, 2010, entitled "Electronic Appliance Status Notification via a Home Entertainment System", which is hereby incorporated by reference, describes such techniques in further detail.

Also shown in FIG. 2, utility monitor 202 may serve to provide television receiver 150 or overlay device 251 with utility information, such as electricity usage, gas usage, water usage, wastewater usage, irrigation usage, etc. A user may view a status page or may receive notifications upon predefined events occurring, such as electricity usage exceeding a defined threshold within a month, or current kilowatt usage exceeding a threshold.

FIG. 2 further shows a health sensor 214 that may permit a user's vital characteristics to be monitored, such as a heart rate. In some embodiments, additionally or alternatively, health sensor 214 may contain a button or other type of actuator that a user can press to request assistance. As such, health sensor 214 may be mounted to a fixed location, such as bedside, or may be carried by a user, such as on a lanyard. Such a request may trigger a notification to be presented to other users via display device 160 and/or wireless device 216. Additionally or if the notification is not cleared by another user within a predefined period of time, a notification may be transmitted to emergency first responders to request help. In some embodiments, a home automation service provider may first try contacting the user, such as via phone, to determine if an emergency is indeed occurring. Such a health sensor 214 may have additional purposes, such as for notification of another form of emergency, such as a break-in, fire, flood, theft, disaster, etc. In some examples, the health sensor 214 may receive signals from various cameras, temperature sensors, and other monitoring equipment in connection with the home automation system, analyze such signals, and store or report such signals as necessary.

Further in reference to FIG. 2, in addition to such parallel notifications being based on data from health sensor 214, data from other devices may trigger such parallel notifications according to various rules within the home automation system. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications. A configuring user may be able to select whom to notify from a list of users provided by the home automation system and to select a method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be 1) SMS Message, 2) push notification, 3) electronic voice recorder places call to primary number, and 4) electronic voice recorder places call to spouse's number. The second notification may never happen if the user replies to the SMS message with an acknowledgment. Or, the second notification would automatically happen if the SMS gateway cannot be contacted.

Referring again to FIG. 2, intercom 218 may permit a user in one location to communicate with a user in another location, who may be using wireless device 216, display device 160 or some other device, such another television receiver within the structure. Intercom 218 may be integrated with camera 212 or may use a dedicated microphone/speaker, such as a Bluetooth® microphone. Microphones/ speakers of wireless device 216, display device 160, communication device 252, overlay device 251 may also or alternatively be used. A multimedia over coax (MOCA) network or other appropriate type of network may be used to provide audio and/or video based intercom via television receiver 150 with other television receivers and/or wireless devices in communication with television receiver 150. Similarly, video and/or audio conferencing can be provided, such that communication with persons via the Internet is possible. Therefore, one possible use would be video and/or audio conferencing within a structure using each television receiver (and associated connected display devices) in the structure that are in communication, or allowing each television receiver to perform video/audio conferencing with other devices external to the structure or local area network.

Referring to FIG. 2, to enable intercom 218, a microphone may be placed in a location where a user would typically be using intercom 218. For instance, a microphone may be placed near display device 160. In some embodiments, a microphone may be integrated into a remote control of television receiver 150. As such, if a user is using television receiver 150 via remote control, the user would have access to a microphone. In at least one embodiment, a user can leverage the wireless device 216, such as a mobile phone or tablet computer, as the microphone for the home automation system.

Referring again to FIG. 2, doorbell sensor 223 may permit an indication of when a doorbell has been rung to be sent to multiple devices, such as television receiver 150 and/or wireless device 216. In some embodiments, doorbell sensor 223 detecting a doorbell ring may trigger video to be recorded by camera 212 of the area near the doorbell and the video to be stored until deleted by a user (or stored for predefined period of time).

Further, as shown in FIG. 2, such a microphone, or a microphone on one or more other home automation devices, may allow for voice recognition to be performed by television receiver 150. Voice recognition may allow for a particular user to be determined and for commands to be completed based on a user speaking such commands. For instance, an adult user may be permitted to perform certain functions that a child user cannot; such as unlocking doors. Each user may provide a voice sample which is used by television receiver 150 to distinguish users from each other. Further, users may be able to speak commands, such as "lower heat 5 degrees," to control home automation devices. Based on the command received, television receiver 150 may determine to which home automation device the command is intended and may transmit an appropriate command (such as, in this example, a command to lower the heat setting by five degrees to thermostat 222). In at least one embodiment, a user may use a user-defined code word that precedes or follows a command, such as "sesame," then speaking a command such as "turn on the living room lights." In some embodiments, in addition or in alternate to voice identification, fingerprint identification may be used to determine an identity of a user. Specific functions of television receiver 150 may require that a user log in, such as via a fingerprint scanner, before being able to view and/or modify such functions.

Referring to FIG. 2, light controller 220 may permit a light to be turned on, off, and/or dimmed by television receiver 150 or overlay device 251 (such as based on a user command received via wireless device 216 or directly via television receiver 150 or overlay device 251). Light controller 220 may control a single light. As such, multiple different light controllers 220 may be present within a house. In some embodiments, a physical light switch (which opens and closes a circuit of the light) may be left in the on position such that light controller 220 can be used to control whether the light is on or off. Light control 220 may be integrated into a light bulb or into a circuit (such as between the light fixture and the power source) to control whether the light is on or off. The user, via television receiver 150 or overlay device 251 may be permitted to view a status of all light controllers 220 within a location. Since television receiver 150 or overlay device 251 may communicate using different home automation protocols, different light controllers 220 (and, more generally, different home automation devices) within a location may use disparate communication protocols, but may all still be controlled by television receiver 150 or overlay device 251. In some embodiments, wireless light switches may be used that communicate with television receiver 150 or overlay device 251. Such switches may use a different communication protocol than light controllers 220. Such a difference may not affect functionality because television receiver 150 or overlay device 251 can serve as a hub for multiple disparate communication protocols and perform any necessary translation and/or bridging functions. For example, a tablet computer may transmit a command over a WiFi connection and television receiver 150 or overlay device 251 may translate the command into an appropriate Zigbee or Zwave command for a wireless light bulb. In some embodiments, the translation may occur for a group of disparate devices. For example, a user decides to turn off all lights in a room and selects a lighting command on the tablet computer. The overlay device 251 identifies the lights in the room and outputs appropriate commands to all devices over different protocols, such as a Zigbee wireless lightbulb and a Zwave table lamp. Television receiver 150 may permit timers and/or dimmer settings to be set for lights via light controller 220. For instance, lights can be configured to turn on/off at various times during a day according to a schedule (and/or events being detected by the home automation system).

Referring again to FIG. 2, thermostat 222 may communicate with television receiver 150 or overlay device 251. Thermostat 222 may provide heating/cooling updates on the location to television receiver 150 or overlay device 251 for display via display device 160 and/or wireless device 216. Further, control of thermostat 222 may be effectuated via television receiver 150 or overlay device 251. Zone control within a structure using multiple thermostats may also be possible.

Leak detection sensor 224 of FIG. 2 may be in communication with television receiver 150 or overlay device 251 and may be used to determine when a water leak has occurred, such as in pipes supplying water-based fixtures with water. Leak detection sensor 224 may be configured to attach to the exterior of a pipe and listen for a sound of water moving within a pipe. In other embodiments, sonar, temperature sensors or ion infused water with appropriate sensors may be used to detect moving water. As such, cutting or otherwise modifying plumbing may not be necessary to use leak detection sensor 224. If water movement is detected for greater than a threshold period of time, it may be determined that a leak is occurring. Leak detection sensor 224 may have a component that couples over an existing valve such that the flow of water within one or more pipes can be stopped. For instance, if leak detection sensor 224 determines a leak may be occurring, a notification may be provided to a user via wireless device 216 and/or display device 160 by television receiver 150 or overlay device 251. If a user does not clear the notification, the flow of water may be shut off by leak detection sensor 224 after a predefined period of time. A user may also be able to provide input to allow the flow of water to continue or to immediately interrupt the flow of water.

Further shown in FIG. 2, VoIP (voice over IP) controller 225 may permit television receiver 150 to serve as a hub for a home phone system. One or more conventional telephones may be connected with television receiver 150. Calls may be converted to IP by television receiver 150, which may further allow for calls to be received and placed via network 270 that is connected with the Internet. The need for a dedicated home phone line may thus be eliminated. In some embodiments, a cellular back channel (e.g., via a cellular modem) may be utilized as a backup to other types of internet connections, such as DSL, cable modems or satellite internet.

Appliance controller 226 of FIG. 2 may permit a status of an appliance to be retrieved and commands to control operation to be sent to an appliance by television receiver 150 or overlay device 251. For instance, appliance controller 226 may control a washing machine, a dryer, a dishwasher, an oven, a microwave, a refrigerator, a toaster, a coffee maker, a hot tub, or any other form of appliance. Appliance controller 226 may be connected with the appliance or may be integrated as part of the appliance.

Appliances and other electronic devices may also be monitored for electricity usage. For instance, U.S. Pat. Pub. No. 2013/0318559, filed Nov. 19, 2012, to Crabtree, entitled "Apparatus for Displaying Electrical Device Usage Information on a Television Receiver," which is hereby incorporated by reference, may allow for information regarding the electricity usage of one or more devices (e.g., other home automation devices or circuits within a home that are monitored) to be determined. Control of one or more home automation devices may be dependent on electrical usage and stored electrical rates. For instance, a washing machine may be activated in the evening when rates are lower. Additionally or alternatively, operation of devices may be staggered to help prevent consuming too much power at a given time. For instance, an electric heater may not be activated until a dryer powered via the same circuit is powered down.

Garage door controller 228 of FIG. 2 may permit a status of a garage door to be checked and the door to be opened or closed by a user via television receiver 150 or overlay device 251. In some embodiments, based on a location of wireless device 216, the garage door may be controlled. For instance, if wireless device 216 is a cellular phone and it is detected to have moved a threshold distance away from a house having garage door controller 228 installed, a notification may be sent to wireless device 216. If no response is received within a threshold period of time, the garage may be automatically shut. If wireless device 216 moves within a threshold distance of garage door controller 228, the garage may be opened.

Lock controller 230 of FIG. 2 may permit a door to be locked and unlocked and/or monitored by a user via television receiver 150 or overlay device 251. In some embodiments, lock controller 230 may have an integrated door sensor 208 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, lock controller 230 may have an integrated door sensor 208 that allows for the single lock controller 230 to lock/unlock a door and provide a status as to whether the door is open or shut. Therefore, a single device may control a lock and determine whether the associated door is shut or open. Such a single device may have a single power source that allows for sensing of the lock position, sensing of the door position, and for engagement/disengagement of the lock. Lock controller 230 may have an integrated door sensor that includes a reed switch or proximity sensor that detects when the door is in a closed position. Other forms of sensing may also be used, such as a proximity sensor to detect a doorframe.

A home security system 207 of FIG. 2 may be integrated with a home automation system. The home security system 207 may detect motion, when a user has armed/disarmed the home security system 207, when windows/doors are opened or broken, etc. Television receiver 150 may adjust settings of home automation devices based on home security system 207 being armed or disarmed. A virtual control and alarm panel may be presented to a user via a display device 160 and television receiver 150. The functions of a wall mounted panel alarm can be integrated in the graphical user interface of the TV viewing experience such as a menu system with an underlying tree structure. The virtual control and alarm panel can appear in a full screen or Picture-in-Picture (PiP) with TV content. Alarms and event notification can be in the form of scrolling text overlays, popups, flashing icons, etc. Camera video (e.g., from camera 212) can be integrated with the standard DVR content of television receiver 150 with additional search, zoom, time-line capabilities. The camera's video stream can be displayed full screen, PiP with TV content, or as a tiled mosaic to display multiple camera's streams at a same time. In some embodiments, the display can switch between camera streams at fixed intervals. Television receiver 150 may perform video scaling, adjust frame rate and transcoding on video received from camera 212. In addition, television receiver 150 may adaptively transcode the camera content to match an Internet connection.

Irrigation controller 232 of FIG. 2 may allow for a status and control of an irrigation system (e.g., sprinkler system) to be controlled by a user via television receiver 150 and/or overlay device 251. Irrigation controller 232 may be used in conjunction with weather sensor 206 to determine whether and/or for how long irrigation controller 232 should be activated for watering. Further, a user, via television receiver 150 and/or overlay device, may turn on, turn off, or adjust settings of irrigation controller 232.

One or more motion sensors can be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat 222, shutting off lights via light controller 220, and determining if one or more doors are closed by door sensor 208. In some embodiments, a user-defined script may be run when it is determined that no users or other persons are present within the structure.

Additional forms of sensors not illustrated in FIG. 2 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless device 216 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 when within range. For instance, when a vehicle has been parked within range of a local wireless network with which television receiver 150 is connected, video and/or audio may be transmitted from the dashcam to the television receiver for storage and/or uploading to a remote server.

The home automation functions detailed herein that are attributed to television receiver 150 may alternatively or additionally be incorporated into overlay device 251. As such, a separate overlay device 251 may be connected with display device 160 to provide home automation functionality.

Figure 3:
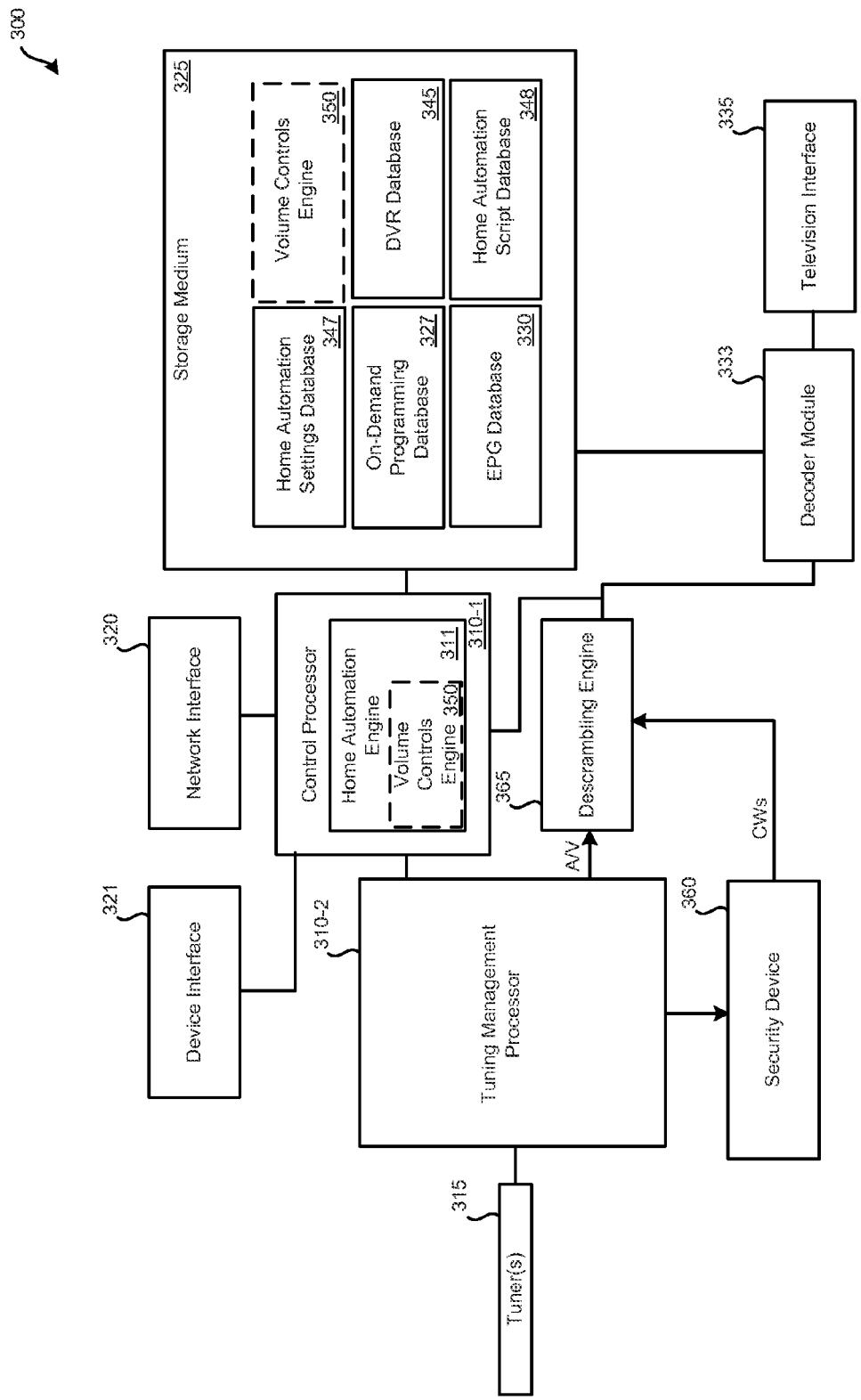
FIG. 3 shows an embodiment of a television receiver configured to host a home automation system.

Turning now to FIG. 3, an embodiment of a television receiver 300, which may represent television receiver 150 of FIG. 1 and/or FIG. 2, is illustrated. Television receiver 300 may be configured to function as a host for a home automation system either alone or in conjunction with a communication device, such as communication device 252 of FIG. 2. Television receiver 300 may be in the form of a separate device configured to be connected with a display device, such as a television. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

As shown in FIG. 3, television receiver 300 may be incorporated as part of a television, such as display device 160 of FIG. 1. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, digital video recorder (DVR) database 345 (which may include provider-managed television programming storage and/or user-defined television programming), on-demand programming database 327, home automation settings database 347, home automation script database 348, security device 360, and/or descrambling engine 365. In another aspect, the television receiver 300 may include a volume controls engine 350, which may be provided for in the storage medium 325 and/or the control processor 310-1, such as the home automation engine 311 of the control processor 310-1.

In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components. For instance, the home automation settings database 347, home automation script database 348, and/or volume controls engine 350 may be provided for, wholly or partly, in the overlay device 241.

In FIG. 3, processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 of FIG. 3 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320, device interface 321, and/or a remote control interface. Control processor 310-1 may handle incoming data from network interface 320 and device interface 321, which may receive input from a remote control. Additionally, control processor 310-1 may be configured to output data via network interface 320.

Control processor 310-1 of FIG. 3 may include the home automation engine 311. Home automation engine 311 may permit television receiver 300 and control processor 310-1 to provide home automation functionality. Home automation engine 311 may have a JSON (JavaScript Object Notation) command interpreter or some other form of command interpreter that is configured to communicate with wireless devices via network interface 320 and a message server (possibly via a message server client). Such a command interpreter of home automation engine 311 may also communicate via a local area network with devices (without using the Internet). Home automation engine 311 may contain multiple controllers specific to different protocols; for instance, a ZigBee® controller, a Z-Wave® controller, and/or an IP camera controller (wireless LAN, 802.11) may be present. Home automation engine 311 may contain a media server configured to serve streaming audio and/or video to a remote devices (on a local area network or the Internet). Television receiver may be able to serve such devices with recorded content, live content, and/or content recorded using one or more home automation devices, such as camera 212.

Tuners 315 of FIG. 3 may include one or more tuners used to tune to transponders that include broadcasts of one or more television channels. Such tuners may be used also to receive for storage on-demand content and/or credit-earning television commercials and/or home automation functions. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to which frequencies are to be tuned.

Network interface 320 of FIG. 3 may be used to communicate via an alternate communication channel with a television service provider, if such communication channel is available. A communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Besides the primary communication channel being satellite, cable network, an IP-based network, or broadcast network may be used. Network interface 320 may permit wireless communication with one or more types of networks, including using home automation network protocols and wireless network protocols. Also, wired networks may be connected to and communicated with via network interface 320. Device interface 321 may represent a USB port or some other form of communication port that permits communication with a communication device.

Storage medium 325 of FIG. 3 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to on-demand programming database 327, EPG database 330, DVR database 345, home automation settings database 347, home automation script database 348, and/or volume controls engine 350. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

Home automation settings database 347 of FIG. 3 may allow configuration settings of home automation devices and user preferences to be stored. Home automation settings database 347 may store data related to various devices that have been set up to communicate with television receiver 300. For instance, home automation settings database 347 may be configured to store information on which types of events should be indicated to users, to which users, in what order, and what communication methods should be used. For instance, an event such as an open garage may only be notified to certain wireless devices (e.g., a cellular phone associated with a parent, not a child), notification may be by a third-party notification server, email, text message, and/or phone call. In some embodiments, a second notification method may only be used if a first fails. For instance, if a notification cannot be sent to the user via a third-party notification server, an email may be sent.

Home automation settings database 347 of FIG. 3 may store information that allows for the configuration and control of individual home automation devices which may operate using Z-wave and Zigbee—specific protocols. To do so, home automation engine 311 may create a proxy for each device that allows for settings for the device to be passed through a UI (e.g., presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device.

Home automation script database 348 of FIG. 3 may store scripts that detail how home automation devices are to function based on various events occurring. For instance, if stored content starts being played back by television receiver 300, lights in the vicinity of display device 160 may be dimmed and shades may be lowered by shade controller 204. As another example, when a user shuts programming off late in the evening, there may be an assumption the user is going to bed. Therefore, the user may configure television receiver 300 to lock all doors via lock controller 230, shut the garage door via garage controller 228, lower a heat setting of thermostat 222, shut off all lights via light controller 220, and determine if any windows or doors are open via window sensor 210 and door sensor 208 (and, if so, alert the user). Such scripts or programs may be predefined by the home automation/television service provider and/or may be defined by a user.

In some embodiments, home automation script database 248 of FIG. 3 may allow for various music profiles to be implemented. For instance, based on home automation settings within a structure, appropriate music may be played. For instance, if the lights are dimmed, romantic music may be played. Conversely, based on the music being played, settings of home automation devices may be determined. If television programming, such as a movie, is output for playback by television receiver 150, a particular home automation script may be used to adjust home automation settings (e.g., lower lights, raise temperature, and lock doors).

EPG database 330 of FIG. 3 may store information related to television channels and the timing of programs appearing on such television channels. EPG database 330 may be stored using storage medium 325, which may be a hard drive or solid-state drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320, via satellite, or some other communication link with a television service provider (e.g., a cable network). Updates to EPG database 330 may be received periodically. EPG database 330 may serve as an interface for a user to control DVR functions of television receiver 300, and/or to enable viewing and/or recording of multiple television channels simultaneously. EPG database 340 may also contain information about on-demand content or any other form of accessible content.

Decoder module 333 of FIG. 3 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously-recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365, simultaneously. For instance, decoders within decoder module 333 may be able to only decode a single television channel at a time. Decoder module 333 may have various numbers of decoders.

Television interface 335 of FIG. 3 may serve to output a signal to a television (or another form of display device) in a proper format for display of video and playback of audio. As such, television interface 335 may output one or more television channels and/or stored television programming from storage medium 325 (e.g., television programs from DVR database 345, television programs from on-demand programming 330 and/or information from EPG database 330) to a television for presentation. Television interface 335 may also serve to output a CVM.

Still referring to FIG. 3, digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 of FIG. 3 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, in a satellite-based television service provider system, data necessary to create the provider-defined timers at television receiver 150 may be received via satellite.

On-demand programming database 327 of FIG. 3 may store additional television programming. On-demand programming database 327 may include television programming that was not recorded to storage medium 325 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 327 may be the same for each television receiver of a television service provider. On-demand programming database 327 may include pay-per-view (PPV) programming that a user must pay and/or use an amount of credits to view. For instance, on-demand programming database 327 may include movies that are not available for purchase or rental yet. Typically, on-demand programming is presented commercial-free.

Referring back to tuners 315 of FIG. 3, television channels received via satellite (or cable) may contain at least some scrambled data. Packets of audio and video may be scrambled to prevent unauthorized users (e.g., nonsubscribers) from receiving television programming without paying the television service provider. When a tuner of tuners 315 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 300 may use decryption engine 361 of security device 360 to decrypt ECMs. Decryption of an ECM may only be possible if the user has authorization to access the particular television channel associated with the ECM. When an ECM is determined to correspond to a television channel being stored and/or displayed, the ECM may be provided to security device 360 for decryption.

Tuning management processor 310-2 of FIG. 3 may be in communication with tuners 315 and control processor 310-1. Tuning management processor 310-2 may be configured to receive commands from control processor 310-1. Such commands may indicate when to start/stop receiving and/or recording of a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data.

Descrambling engine 365 of FIG. 3 may use the control words output by security device 360 in order to descramble video and/or audio corresponding to television channels and/or home automation functions for storage and/or presentation. Video and/or audio data contained in the transponder data stream received by tuners 315 may be scrambled. Video and/or audio data may be descrambled by descrambling engine 365 using a particular control word. Which control word output by security device 360 to be used for successful descrambling may be indicated by a scramble control identifier present within the data packet containing the scrambled video or audio. Descrambled video and/or audio may be output by descrambling engine 365 to storage medium 325 for storage (in DVR database 345) and/or to decoder module 333 for output to a television or other presentation equipment via television interface 335.

In some embodiments, the television receiver 300 of FIG. 3 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 300 may be configured to reboot at random times during the night in order to allow for installation of updates. Thus, an intruder is less likely to guess the time when the system is rebooting. In some embodiments, the television receiver 300 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system described further below.

While the television receiver 300 has been illustrated as a satellite-based television receiver, it is to be appreciated that techniques below may be implemented in other types of television receiving devices, such a cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 300 may be performed by an overlay device. If such an overlay device, television programming functions may still be provided by a television receiver that is not used to provide home automation functions.

Figure 4:
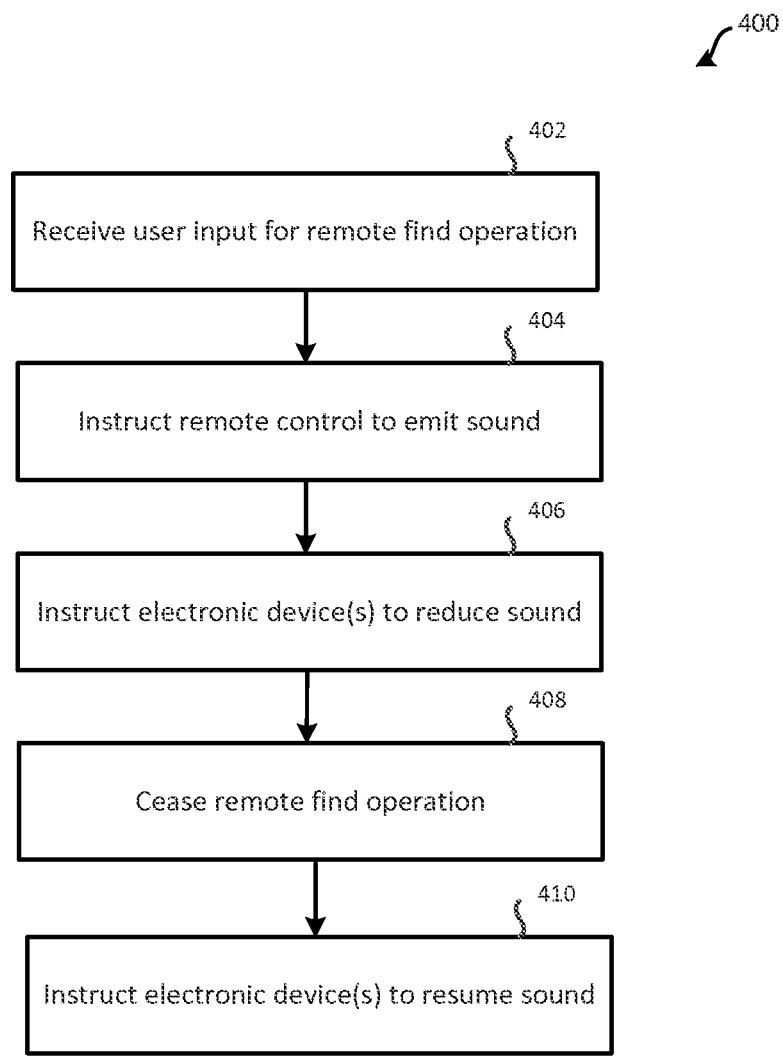
FIG. 4 shows an example method according to the present disclosure.

Turning now to FIG. 4, an example method 400 for adjusting a volume level of a home automation device is shown. It is contemplated that the method 400 is performed by home automation engine 311, and/or more particularly, by volume controls engine 350. As described above, such features may be provided for by television receiver 150, television receiver 300, and/or overlay device 251, or a combination thereof. In an example, a television receiver may be in operative communication with an overlay device that is further connected to various home automation devices. For simplicity, the method 400 will be described as being performed by a television receiver. It is noted that the method may include additional steps, and that any of the steps presented herein may be optional, rearranged, and/or modified to include other steps and/or features described in this application.

The method 400 may include receiving user input for a remote find operation (step 402), where the user input may be indicative of triggering the remote find operation to locate a remote control. The user input may be received upon a user's manual depression or selection of a dedicated button that is provided on the television receiver, television, and/or overlay device. In other examples, the user input may be received wirelessly at the television receiver via communication with a mobile device, such as a smartphone, tablet, and/or laptop computer. For instance, the user may instantiate the remote find operation via a mobile application that is provided on the mobile device. The mobile application may communicate, wirelessly via a local wireless network and/or cellular networks, with the television receiver to activate the remote find operation. In other examples, user input may be received via activation of other dedicated buttons, such as an external trigger button on a key fob that is dedicated to triggering the remote find operation, and/or a separate mountable trigger button. Merely by way of example, such buttons may be physically mounted to an underside of an end table or coffee table and configured to communicate with the television receiver, television, and/or overlay device upon user activation. Such communication pathways may include infrared, radio frequency, Bluetooth, and/or other technologies.

Further, the method 400 may include instructing the remote control to emit a sound (step 404). For example, in response to receiving the user input, the method 400 may include sending, by the television receiver, a remote find instruction to the remote control, whereby the remote find instruction triggers the remote control to emit a beeping sound. In some examples, the television receiver may trigger the remote control to emit other signals, such as flashing lights and/or a particular sound profile. Such sound profiles may be preset to indicate a location or distance of the remote control from the television receiver. For instance, the television receiver may instruct the remote control to output short quick beeps upon determining that the remote control is within a predefined close range of the television receiver, such as in a same room of the television receiver. In another example, the television receiver may instruct the remote control to output long, slow beeps upon determining that the remote control is outside the predefined close range, or in another room. In another example, the television receiver may instruct the remote control to emit the sound at a particular decibel or volume level. Such volume levels may be dependent on a measure of a room's ambient noise, which may be determined by the television receiver, and/or on a distance of the remote control from the television receiver. Further, the television receiver may continue to send subsequent instructions regarding the sound emitted from the remote control. For example, if the remote control has not been located within a predetermined period of time, the television receiver may instruct the remote control to increase a volume level of its sound emission. Other examples are possible.

The method 400 may include instructing other electronic devices, such as another home automation device, to reduce sound during the remote find operation (step 406). For example, the method 400 may include, in response to receiving the user input, sending, by the television receiver, a temporary quiet instruction to the home automation device. In some examples, sending the temporary quiet instruction may be performed simultaneously, immediately before, and/or immediately after sending the remote find instruction to the remote control at step 404. The quiet instruction may initiate a lowering of the volume level of the home automation device such that any sound being output from the home automation device does not cover up or otherwise interfere with sound being emitted from the remote control as a part of the remote find operation. In some cases, the quiet instruction initiates the lowering of the volume level of the home automation device to a muted volume level. In another example, the temporary quiet instruction includes instructions for muting or otherwise maintaining the lowered level of sound for a predetermined period of time, such that after passage of that time, the home automation device resumes sound output at an original, preceding volume level. In still another example, upon passage of the predetermined period of time, the television receiver may send additional instructions to the home automation device to reinitiate muting of the volume level and/or to further decrease the volume level of the home automation device. Other examples are possible.

It is contemplated that a variety of methods for communication the temporary quiet instructions to the home automation device, and/or a plurality of home automation devices, may be utilized. In a particular example, the television receiver may be in operative, bi-directional communication with a network of home automation devices via a home automation network. In other examples, the television receiver may be connected to the home automation network via the overlay device. It is contemplated that wireless communication pathways and wired communication pathways may be implemented. For instance, the television receiver may relay HDMI-CEC commands or instructions via an HDMI link between the television receiver, speakers, and/or television. In another example, the instructions may be relayed to one or more devices via Bluetooth communications. In still other examples, instructions may be relayed by the television receiver via a plurality of different communication pathways.

Further, it is noted that the television receiver may transmit temporary quiet instructions to every device in a network or plurality of networks. In some cases, the temporary instructions are global and transmitted to every device in the network(s), and in other cases, the temporary instructions are unique for each device in the network(s). For instance, the quiet instructions may include muting for particular devices, and a decreased volume setting for other devices. Still, in other examples, the quiet instructions may call for pausing an operation and/or shut down of a device, for instance, if sound output is necessarily tied to the nature of the device's operation. The television receiver may send temporary quiet instructions to only those devices generating sound. In other cases, the television receiver may transmit temporary quiet instructions to only those devices that generate sound above a threshold sound level. Still, in other cases, the television receiver may transmit quiet instructions to devices generating sound in a particular location and/or area of the house. It is noted that the temporary quiet instructions may include any combination of the foregoing and that other examples are possible.

In some cases, the method 400 may include determining which home automation devices are outputting sound and/or their current volume level. For instance, the television receiver may, in response to the user input, determine a sound level being output by a home automation device. The television receiver may compare the sound level to a threshold sound level, and/or generate the quiet instruction based on the comparison. Further, the method 400 may include, in response to the user input, determining one or more additional home automation devices that are currently outputting sound, and/or sending, by the television receiver, additional temporary quiet instructions to the determined additional home automation devices. In still other cases, the method 400 may include, in response to the user input, determining, by the television receiver, one or more additional home automation devices that are currently outputting sound above a threshold level, and sending, by the television receiver, additional temporary quiet instructions to the determined additional home automation devices that are currently outputting sound above the threshold level.

Further shown in FIG. 4, the method 400 may include ceasing the remote find operation (step 408). For instance, the method 400 may include receiving, by the television receiver, an indication from the remote control to end the remote find operation. Such indications may be generated by a user pressing a button on the remote control to indicate that it has been found. In another example, the user may wish to end the remote find operation without having located the remote control. Such indications may be provided by the user depressing a button on the television receiver, television, and/or overlay device. In another aspect, such indications to end the remote find operation may be transmitted by a user to the television receiver via the mobile device. Still, in other examples, ceasing the remote find operation may be based on a passage of a predetermined period of time, such as five minutes, whereupon the remote find operation may be reinstated upon receiving additional user input.

In some cases, the method 400 may include instructing electronic devices to resume sound (410). For instance, the method may include determining, by the television receiver, a defined period of time has passed since sending the remote find instruction to the remote control. Based on the determination, the television receiver may send a resume instruction to the home automation device to return the lowered volume level to an original volume level. In another example, based on indication from a user to end the remote find operation, the method 400 may include sending, by the television receiver, the resume instruction to the home automation device to return the lowered or muted volume level to an original volume level. Such resume instructions may be transmitted to the home automation device utilizing the same communication pathways for transmitting the quiet instructions at step 406. It is noted that this step, and/or any of the other steps presented in any method of this disclosure, may be optional. For instance, temporary quiet instructions may indicate a predetermined period of time for maintaining the lowered or muted volume level at the home automation device, where after passage of the predetermined period of time, the home automation device automatically resumes its original volume output. In that case, resume instructions may not be sent from the television receiver. Other examples are possible.

Figure 5:
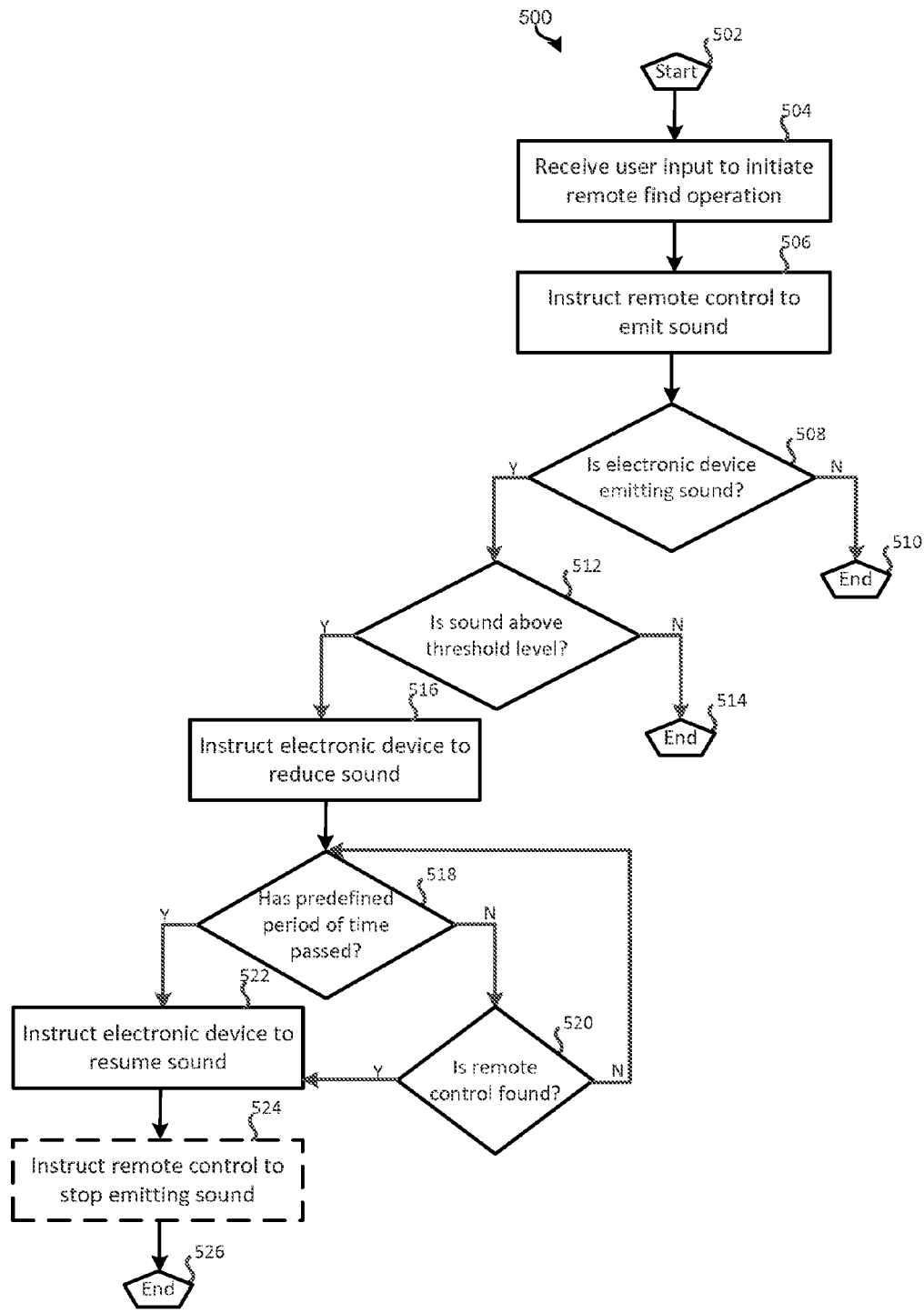
FIG. 5 shows another example method according to the present disclosure.

Turning now to FIG. 5, another example method 500 for adjusting a volume level of a home automation device is shown. It is contemplated that the method 500 is performed by home automation engine 311, and/or more particularly, by volume controls engine 350. As described above, such features may be provided for by television receiver 150, television receiver 300, and/or overlay device 251, or a combination thereof. It is noted that the method may include additional steps, and that any of the steps presented herein may be rearranged, optional and/or modified to include other steps and/or features described in this application.

The method 500 may start (step 502) with receiving user input to initiate a remote find operation (step 504). In response to receiving the user input, the method 500 may include instructing the remote control to emit a sound (step 506). In some cases, instructions transmitted to the remote control may define a particular sound profile, such as a type of sound and/or sound sequence, and/or a predetermined length of time for emitting the sound. Further, the method 500 may include determining a location of the remote control and/or a distance of the remote control from the television receiver. The instructions transmitted to the remote control may include a volume level of the sound to be emitted. For example, the television receiver may determine that the remote control is located farther away and/or in a different room, and based on the determination, instruct the remote control to emit a louder and/or higher-pitched sound.

The method 500 may include determining if the one or more electronic devices, such as home automation devices, is presently emitting sound, and/or identifying which electronic devices are presently emitting sound (step 508). If a particular device is not emitting sound, the example method 500 may end for that particular device, although it is noted that the remote find operation may continue and that other devices may still receive quiet instructions. If the particular device is emitting sound, the method 500 may determine if the sound is above a threshold level (step 512). If the sound is not above the threshold level, the method 500 may end (step 514) for that particular device while the remote find operation remains active. However, if the sound is above the threshold level, the method 500 may include instructing the electronic device to reduce its sound output (step 516). It is noted that the method 500 may include sending quiet instructions to all devices regardless of their individual levels of sound output. In some cases, the quiet instructions may prevent devices that were not outputting sound from outputting sound later on if the remote find operation is still active. In some cases, the quiet instructions may prevent such devices from outputting sounds above the threshold level and/or from outputting any sound at all.

Further, the method 500 may include determining if a predefined period of time has passed since initiating the remote find operation (step 518). If not, the method 500 may include determining if the remote control has been found (step 520), e.g. if a user input from the remote control has been received by the television receiver. If the remote control has not been found, e.g. no user input from the remote control has been received, the method 500 may loop back to monitoring for passage of a predetermined period of time at step 518. If the remote control has been found at step 520 and/or the predetermined period of time has passed at step 518, the method 500 may include instructing the electronic device to resume its sound output (step 522). In some cases, the instructions may include resuming the sound output to an original level of sound. In another example, the method 500 may include instructing the remote control to stop emitting sound (step 524) and end (step 526) the remote find operation.

Figure 6:
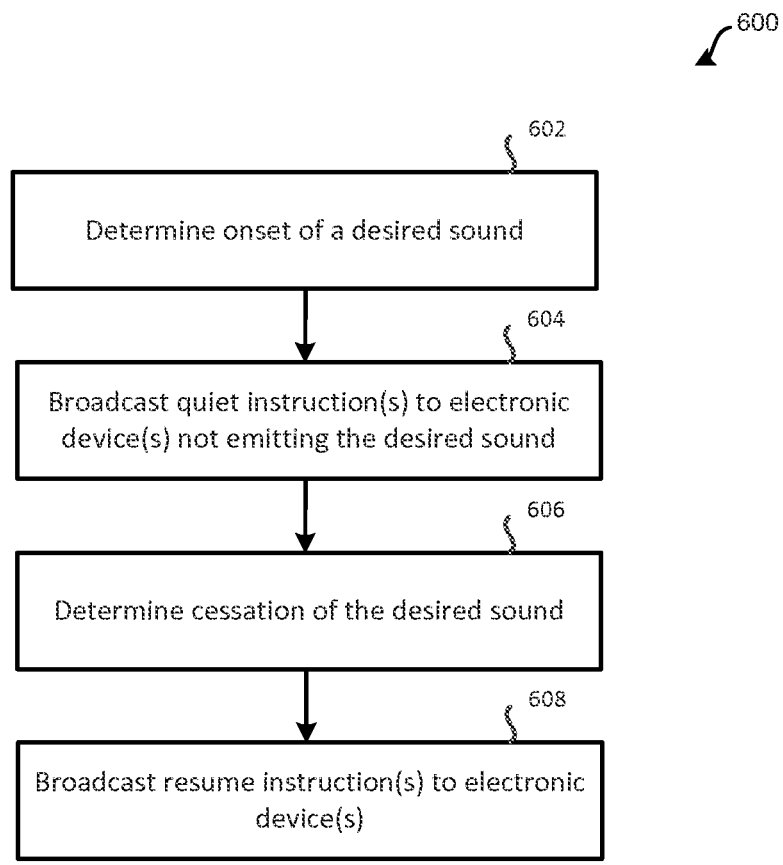
FIG. 6 shows yet another example method according to the present disclosure.

It is noted that although a remote control find operation is discussed herein, any instance where a desired sound is being output from a device while in the presence of other sound output from other devices, such as a televisions and/or speakers, may benefit from the systems and methods described herein. For instance, turning to FIG. 6, another example method 600 for adjusting a volume level of a home automation device is shown. It is contemplated that the method 600 is performed by home automation engine 311, and/or more particularly, by volume controls engine 350. As described above, such features may be provided for by television receiver 150, television receiver 300, and/or overlay device 251, or a combination thereof. It is noted that the method may include additional steps, and that any of the steps presented herein may be rearranged, optional and/or modified to include other steps and/or features described in this application.

The method 600 may include determining an onset of a desired sound (step 602). For instance, the method 600 may determining that a remote control find operation, and/or any other audial-based device finder, is initiated and/or about to emit sound for locating the device. In another example, the audial-based device finder may include a key fob that emits the sound in response to activation of a key locator button or switch, which may be provided via on a television receiver, remote control, television, overlay device, and/or any mobile device. Still, in other examples, the method 600 may include identifying events categorized as having desired sounds, such as detecting incoming cellular phone calls, incoming VoIP calls, activity of a baby monitor, and so on. Such detections may be sensed by microphones and/or cameras in operative communication with the television receiver, and/or based on detection of various incoming and/or outgoing signals that are picked up by the television receiver and/or in a vicinity of a television receiver. It is noted that preceding step 602, the user may activate the method 600 to listen for particular events, and/or the method 600 may be activated based on a timer and/or time of day.

Further, the method 600 may include broadcasting one or more quiet instructions to one or more electronic devices that are not emitting the desired sound (step 604). For instance, the method 600 may determine one or more electronic devices that are outputting other sounds that may potentially mask output of the desired sound. The method 600 may include transmitting quiet instructions to mute and/or otherwise decrease volume levels of those devices. In another example, the method 600 includes sending quiet instructions to all devices to mute and/or decrease volume levels thereof for a predetermined period of time, or while the desired sound is present.

Still further, the method 600 may include determining a cessation of the desired sound (step 606). For instance, the method 600 may include determining that a volume level of the desired sound has diminished, and/or that an incoming/outgoing signal corresponding to the desired sound is no longer present. Still, the method 600 may include detecting an input indicating cessation of the desired sound, e.g. manual user input directed to ending the desired sound. Subsequently, the method 600 may include broadcasting resume instruction(s) to the electronic device(s) to resume an original sound output and/or sound level (step 608). Other examples are possible.

Figure 7:
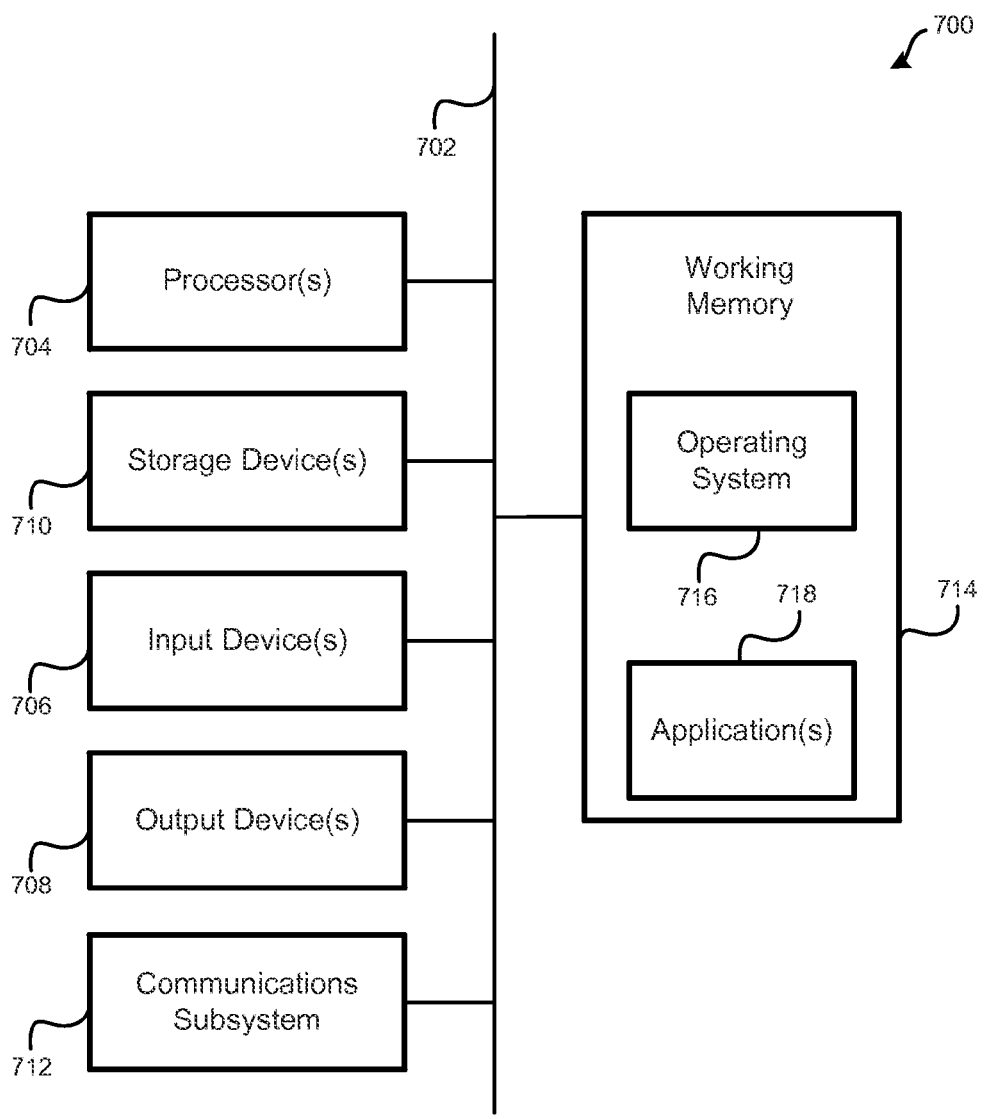
FIG. 7 shows an example block diagram for a computing system upon which various features of the present disclosure may be provided.

Turning now to FIG. 7, an example block diagram for a computer system or device 700 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 1, FIG. 2, and FIG. 3. In this manner, any of one or more of the respective elements of at least FIG. 1, FIG. 2, and FIG. 3 may be configured to perform and/or include instructions that, when executed, perform the methods and features of FIG. 4, FIG. 5, and/or FIG. 6. Still further, any of one or more of the respective elements of at least FIG. 2 may be configured to perform and/or include instructions that, when executed, instantiate and implement functionality of the television receiver 150 and/or the server(s).

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for adjusting volume levels of home automation devices associated with a television receiver and a remote control, comprising:
   receiving, by the television receiver connected to a home automation network, a user input indicative of triggering a remote find operation to locate the remote control;
   in response to the user input, sending, by the television receiver, a remote find instruction to the remote control, wherein the remote find instruction triggers the remote control to emit a sound;
   determining one or more characteristics associated with each of a set of home automation devices on the home automation network, wherein the one or more characteristics are tied to a nature of operation of the home automation devices;
   determining, based on the characteristics associated with the set of home automation devices, a first subset of the set of home automation devices;
   transmitting, by the television receiver, a first quiet instruction to the first subset of home automation devices, wherein the first quiet instruction initiates a muting of the first subset of home automation devices while the remote control is emitting the sound as a part of the remote find operation;
   determining, based on the characteristics associated with the set of home automation devices, a second subset of the set of home automation devices, wherein volumes of sound emitting from the home automation devices in the second subset are each compared to a threshold volume; and
   transmitting, by the television receiver, a second quiet instruction to the second subset of home automation devices based on the comparison, wherein the second quiet instruction initiates a lowering of a volume level of the second subset of home automation devices while the remote control is emitting the sound as a part of the remote find operation.

2. The method for adjusting a volume level of a home automation device of claim 1, further comprising:
   in response to the user input, determining, by the television receiver, a volume being output by a home automation device of the second subset;
   comparing, by the television receiver, the volume to a threshold volume.

3. The method for adjusting a volume level of a home automation device of claim 1, further comprising:
   in response to the user input, determining, by the television receiver, one or more additional home automation devices that are currently outputting sound; and
   sending, by the television receiver, additional temporary quiet instructions to the determined additional home automation devices.

4. The method for adjusting a volume level of a home automation device of claim 1, further comprising:
   in response to the user input, determining, by the television receiver, one or more additional home automation devices that are currently outputting sound above a threshold level; and sending, by the television receiver, additional temporary quiet instructions to the determined additional home automation devices that are currently outputting sound above the threshold level.

5. The method for adjusting a volume level of a home automation device of claim 1, further comprising:
   determining, by the television receiver, a defined period of time has passed since sending the remote find instruction to the remote control; and
   based on the determination, sending, by the television receiver, a resume instruction to the home automation devices of the second subset to return the lowered volume level to an original volume level.

6. The method for adjusting a volume level of a home automation device of claim 5, further comprising:
   based on the determination, sending, by the television receiver, a cease instruction to the remote control to stop emitting a sound.

7. The method for adjusting a volume level of a home automation device of claim 1, further comprising:
   receiving, by the television receiver, an indication from the remote control to cease the remote find operation; and
   in response to the indication, sending, by the television receiver, a resume instruction to the home automation devices of the second subset to return the lowered volume level to an original volume level.

8. The method for adjusting a volume level of a home automation device of claim 1, wherein:
   the second quiet instruction initiates the lowering of the volume level of the home automation device to a muted volume level.

9. A system for adjusting volume levels of home automation devices associated with a television receiver and a remote control, comprising:
   a computer system, wherein the computer system is configured to:
      receiving a user input indicative of triggering a remote find operation to locate the remote control;
      in response to the user input, send a remote find instruction to the remote control, wherein the remote find instruction triggers the remote control to emit a sound;
      determine one or more characteristics associated with each of a set of home automation devices on the home automation network, wherein the one or more characteristics are tied to a nature of operation of the home automation devices;
      determine, based on the characteristics associated with the set of home automation devices, a first subset of the set of home automation devices;
      transmit, by the television receiver, a first quiet instruction to the first subset of home automation devices, wherein the first quiet instruction initiates a muting of the first subset of home automation devices while the remote control is emitting the sound as a part of the remote find operation;
      determine, based on the characteristics associated with the set of home automation devices, a second subset of the set of home automation devices, wherein volumes of sound emitting from the home automation devices in the second subset are each compared to a threshold volume; and
      transmit, by the television receiver, a second quiet instruction to the second subset of home automation devices based on the comparison, wherein the second quiet instruction initiates a lowering of a volume level of the second subset of home automation devices while the remote control is emitting the sound as a part of the remote find operation.

10. The system for adjusting a volume level of a home automation device of claim 9, wherein the computer system is configured to:
    in response to the user input, determine a volume being output by a home automation device of the second subset;
    compare the volume to a threshold volume.

11. The system for adjusting a volume level of a home automation device of claim 9, wherein the computer system is configured to:
    in response to the user input, determine one or more additional home automation devices that are currently outputting sound; and
    send additional temporary quiet instructions to the determined additional home automation devices.

12. The system for adjusting a volume level of a home automation device of claim 9, wherein the computer system is configured to:
    in response to the user input, determine one or more additional home automation devices that are currently outputting sound above a threshold level; and
    send additional temporary quiet instructions to the determined additional home automation devices that are currently outputting sound above the threshold level.

13. The system for adjusting a volume level of a home automation device of claim 9, wherein the computer system is configured to:
    determine a defined period of time has passed since sending the remote find instruction to the remote control; and
    based on the determination, send a resume instruction to the home automation devices of the second subset to return the lowered volume level to an original volume level.

14. The system for adjusting a volume level of a home automation device of claim 13, wherein the computer system is configured to:
    based on the determination, send a cease instruction to the remote control to stop emitting a sound.

15. The system for adjusting a volume level of a home automation device of claim 9, wherein the computer system is configured to:
    receive an indication from the remote control to cease the remote find operation; and
    in response to the indication, send a resume instruction to the home automation devices of the second subset to return the lowered volume level to an original volume level.

16. The system for adjusting a volume level of a home automation device of claim 9, wherein:
    the second quiet instruction initiates the lowering of the volume level of the home automation device to a muted volume level.

17. A non-transitory computer-readable medium having instructions stored thereon for adjusting a volume level of a home automation device, the instructions executable by one or more processors for at least:
    receiving, by the television receiver connected to a home automation network, a user input indicative of triggering a remote find operation to locate the remote control;
    in response to the user input, sending, by the television receiver, a remote find instruction to the remote control, wherein the remote find instruction triggers the remote control to emit a sound;

determining one or more characteristics associated with each of a set of home automation devices on the home automation network, wherein the one or more characteristics are tied to a nature of operation of the home automation devices;

determining, based on the characteristics associated with the set of home automation devices, a first subset of the set of home automation devices;

transmitting, by the television receiver, a first quiet instruction to the first subset of home automation devices, wherein the first quiet instruction initiates a muting of the first subset of home automation devices while the remote control is emitting the sound as a part of the remote find operation;

determining, based on the characteristics associated with the set of home automation devices, a second subset of the set of home automation devices, wherein volumes of sound emitting from the home automation devices in the second subset are each compared to a threshold volume; and transmitting, by the television receiver, a second quiet instruction to the second subset of home automation devices based on the comparison, wherein the second quiet instruction initiates a lowering of a volume level of the second subset of home automation devices while the remote control is emitting the sound as a part of the remote find operation.

18. The non-transitory computer-readable medium having instructions stored thereon for adjusting a volume level of a home automation device of claim 17, wherein the instructions executable by one or more processors further comprises:

in response to the user input, determining a sound level being output by a home automation device of the second subset;

comparing the volume to a threshold volume.

19. The non-transitory computer-readable medium having instructions stored thereon for adjusting a volume level of a home automation device of claim 17, wherein the instructions executable by one or more processors further comprises:

in response to the user input, determining one or more additional home automation devices that are currently outputting sound; and sending additional temporary quiet instructions to the determined additional home automation devices.

20. The non-transitory computer-readable medium having instructions stored thereon for adjusting a volume level of a home automation device of claim 17, wherein the instructions executable by one or more processors further comprises:

determining a defined period of time has passed since sending the remote find instruction to the remote control; and based on the determination, sending a resume instruction to the home automation devices of the second subset to return the lowered volume level to an original volume level.

* * * * *